US012790231B2

(12) United States Patent
Wu et al.

(10) Patent No.: US 12,790,231 B2

(45) Date of Patent: Nov. 10, 2026

(54) POSITIVE ELECTRODE ACTIVE MATERIAL AND PREPARATION METHOD THEREOF, LITHIUM-ION SECONDARY BATTERY, AND RELATED BATTERY MODULE, BATTERY PACK, AND APPARATUS

(71) Applicant: Contemporary Amperex Technology Co., Limited, Ningde City (CN)

(72) Inventors: Qi Wu, Ningde City (CN); Changyin Ji, Ningde City (CN); Jinhua He, Ningde City (CN); Liangbin Liu, Ningde City (CN); Jing Sun, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 732 days.

(21) Appl. No.: 17/686,458

(22) Filed: Mar. 4, 2022

(65) Prior Publication Data

US 2022/0185699 A1 Jun. 16, 2022

Related U.S. Application Data

(63) Continuation of application No. PCT/CN2020/106126, filed on Jul. 31, 2020.

(30) Foreign Application Priority Data

Sep. 12, 2019 (CN) ......................... 201910863099.0

(51) Int. Cl.

*C01G 53/50* (2025.01)
*H01M 4/02* (2006.01)

(Continued)

(52) U.S. Cl.

CPC ............ *C01G 53/50* (2013.01); *H01M 4/366* (2013.01); *H01M 4/525* (2013.01);

(Continued)

(58) Field of Classification Search

CPC ........... H01M 10/0525; H01M 10/052; H01M 4/366; H01M 4/525; C01P 2004/64; C01P 2006/12

See application file for complete search history.

(56) References Cited

U.S. PATENT DOCUMENTS

2004/0258836 A1 12/2004 Besenhard et al.
2011/0256453 A1* 10/2011 Kikuchi ............. C01G 45/1228 429/231.95

(Continued)

FOREIGN PATENT DOCUMENTS

CN 103855387 A 6/2014
CN 104701534 A 6/2015

(Continued)

OTHER PUBLICATIONS

The International search report for PCT Application No. PCT/CN2020/106126, dated Oct. 30, 2020, 14 pages.

(Continued)

*Primary Examiner* — Basia A Ridley
*Assistant Examiner* — Jonathan William Estes
(74) *Attorney, Agent, or Firm* — K&L Gates LLP

(57) ABSTRACT

This application relates to a positive electrode active material and a preparation method thereof, a lithium-ion secondary battery and related battery module, battery pack, and apparatus. The positive electrode active material of this application includes a composite oxide of lithium, boron, and a transition metal element, where the transition metal element includes element nickel, and a molar ratio of element nickel to element lithium ranges from 0.55 to 0.95;

(Continued)

the positive electrode active material includes secondary particles formed by primary particles; at least 50% of the primary particles in the secondary particle are arranged radially; in the outermost layer of the secondary particle, 70% or more of the primary particles each have at least two parallel sides; and in a cross section through the center of the secondary particle, 60% or more of the primary particles each have at least two parallel sides.

23 Claims, 9 Drawing Sheets

(51) Int. Cl.
*H01M 4/36* (2006.01)
*H01M 4/525* (2010.01)
*H01M 10/052* (2010.01)
*H01M 10/0525* (2010.01)

(52) U.S. Cl.
CPC ..... *H01M 10/0525* (2013.01); *C01P 2004/64* (2013.01); *C01P 2006/12* (2013.01); *H01M 2004/028* (2013.01); *H01M 10/052* (2013.01)

(56) References Cited

U.S. PATENT DOCUMENTS

2018/0026268 A1* 1/2018 Kim ....................... C01G 53/42
429/223
2018/0166687 A1* 6/2018 Chang .................... C01G 53/42
2019/0260017 A1* 8/2019 Yoo ................... H01M 10/0525
2019/0273285 A1* 9/2019 Kawamura ....... H01M 10/0585
2020/0161651 A1* 5/2020 Sun ......................... C01G 53/42

FOREIGN PATENT DOCUMENTS

| | | | |
|---|---|---|---|
| CN | 105070907 A | 11/2015 | |
| CN | 107644981 A | 1/2018 | |
| CN | 107978751 A | 5/2018 | |
| CN | 108269974 A | 7/2018 | |
| CN | 109244436 A | 1/2019 | |
| CN | 109428077 A | 3/2019 | |
| CN | 109713297 A | 5/2019 | |
| CN | 109888235 A | 6/2019 | |
| KR | 20180015575 A | 2/2018 | |
| WO | WO-2018190675 A1 * | 10/2018 | ........ H01M 10/0525 |

OTHER PUBLICATIONS

The First Office Action for China Application No. 201910863099.0, dated Aug. 2, 2021, 10 pages.
The notification to grant for China Application No. 201910863099.0, dated Jan. 20, 2022, 7 pages.
Kang-Joon Park et al. Improved Cycling Stability of Li[Ni0.90Co0.05Mn0.05]O2 Through Microstructure Modification by Boron Doping for Li-Ion Batteries, Advanced Energy Materials, vol. 8, No. 25, dated Jul. 11, 2018.

* cited by examiner

5

POSITIVE ELECTRODE ACTIVE MATERIAL AND PREPARATION METHOD THEREOF, LITHIUM-ION SECONDARY BATTERY, AND RELATED BATTERY MODULE, BATTERY PACK, AND APPARATUS

CROSS-REFERENCE TO RELATED APPLICATIONS

This application is a continuation of International Application No. PCT/CN2020/106126, filed on Jul. 31, 2020, which claims priority to Chinese Patent Application No. 201910863099.0, filed on Sep. 12, 2019 and entitled "POSITIVE ELECTRODE ACTIVE MATERIAL AND PREPARATION METHOD THEREOF, AND LITHIUM-ION SECONDARY BATTERY", both of which are incorporated herein by reference in their entireties.

TECHNICAL FIELD

This application belongs to the field of electrochemical technologies. More specifically, this application relates to a positive electrode active material and a preparation method thereof. This application further relates to a positive electrode plate, a lithium-ion secondary battery, and a related battery module, battery pack, and apparatus.

BACKGROUND

Lithium-ion batteries are widely applied to electric vehicles and consumer products due to their advantages such as large specific capacity, high energy density, high output power, no memory effect, long cycle life, and low environmental pollution.

With expansion of the application scope, especially with popularization of smart phones and electric vehicles, the demand for high-energy density lithium-ion batteries gradually increases. Nickel-rich positive electrode materials have received extensive attention due to their high actual reversible capacity (usually as high as 170 mAh/g). However, the nickel-rich positive electrode materials still have some key problems that hinder their practical applications, for example, lithium and nickel disorder, poor cycling performance, and poor structural stability (especially at a high temperature).

SUMMARY

A first aspect of this application provides a positive electrode active material, including a composite oxide of lithium, boron, and a transition metal element, where the transition metal element includes element nickel, and a molar ratio of element nickel to element lithium ranges from 0.55 to 0.95; and the positive electrode active material includes secondary particles formed by regular primary particles. In an optional embodiment, among the primary particles in an outer layer of the secondary particle, 70% or more of the primary particles are lath-shaped primary particles.

In any positive electrode active material described in the foregoing first aspect, the positive electrode active material includes the secondary particles formed by the primary particles; at least 50% of the primary particles in the secondary particle are arranged radially from the center of the secondary particle to the periphery thereof; in the outer layer of the secondary particle, 70% or more of the primary particles each have at least two parallel sides; and in a cross section through the center of the secondary particle, 60% or more of the primary particles each have at least two parallel sides.

In any positive electrode active material described in the foregoing first aspect, an average value of an acute angle formed between a length direction of the primary particle and a diameter direction of a position of the primary particle is less than 20 degrees, and optionally less than 15 degrees, for example, less than 10 degrees.

In any of the foregoing positive electrode active materials, an average length of the primary particles may range from 100 nm to 2000 nm, and an average length-width ratio may range from 1:1 to 20:1, and optionally from 2:1 to 15:1.

In any of the foregoing positive electrode active materials, the positive electrode active material may include active material bulk particles doped with element M1 and a coating layer covering the outer surface of each active material bulk particle; the coating layer includes element M2; element M1 may be one or more of Zr, Ti, Te, Al, Ca, Si, Sb, Nb, Pb, V, Ge, Se, W, and Mo; and element M2 may be one or more of Mg, Zn, Al, Ce, Ti, and Zr.

In any of the foregoing positive electrode active materials, a specific surface area of the positive electrode active material ranges from 0.2 $m^2/g$ to 1.2 $m^2/g$, and optionally from 0.3 $m^2/g$ to 1.0 $m^2/g$; and/or D50 of the secondary particle ranges from 6 μm to 20 μm.

In any of the foregoing positive electrode active materials, a ratio of element M1 to element B ranges from 0.3:1 to 3:1;

optionally, concentration of element M1 ranges from 100 ppm to 6000 ppm; and/or concentration of element M2 ranges from 50 ppm to 6000 ppm, and optionally, a concentration ratio of element M1 to element M2 ranges from 1:50 to 50:1.

In any of the foregoing positive electrode active materials, concentration of element B may range from 50 ppm to 5000 ppm.

In any of the foregoing positive electrode active materials, the composite oxide may have a molecular formula shown in formula (1):

$$Li_{1+a}[Ni_xCo_yMn_zB_bM1_cM2_d]O_2 \quad \text{formula (1)},$$

where $0.65<x<1$, $0<y<0.3$, $0<z<0.3$, $0<a<0.2$, $0<b<0.1$, $0<c<0.1$, $0<d<0.1$, and $x+y+z+b+c+d=1$.

A second aspect of this application provides a preparation method of positive electrode active material, including: (1) mixing an active material precursor, a lithium-containing compound, a boron-containing compound, and an M1-containing compound, and performing sintering to obtain a positive electrode active material matrix having lath-shaped primary particles, where element M1 is one or more of Zr, Ti, Te, Al, Ca, Si, Sb, Nb, Pb, V, Ge, Se, W, and Mo, and element M1 is doped inside the positive electrode active material matrix; and (2) mixing the positive electrode active material matrix and an M2-containing compound, and performing sintering to obtain a positive electrode active material coated with an M2 oxide coating on the surface, where element M2 is one or more of Mg, Zn, Al, Ce, Ti, and Zr.

In any preparation method described in the foregoing second aspect, the active material precursor may include element nickel, and a molar ratio of element nickel to element lithium in the lithium-containing compound ranges from 0.55 to 0.95.

In any of the foregoing preparation method, a sintering temperature in step (1) may range from 700° C. to 1000° C., and optionally from 750° C. to 950° C.; and/or a sintering temperature in step (2) may range from 180° C. to 700° C., and optionally from 200° C. to 650° C.

Any of the foregoing preparation method may further include:

between step (1) and step (2), washing the positive electrode active material matrix in a solution, and performing drying.

In any of the foregoing preparation method, the active material precursor may be a ternary active material precursor $[Ni_xCo_yMn_z](OH)_2$, where $0.65<x<1$, $0<y<0.3$, and $0<z<0.3$.

A third aspect of this application provides a positive electrode active material which is prepared by using any of the foregoing preparation method.

A fourth aspect of this application provides a positive electrode plate, inducing a current collector and a positive electrode active material layer disposed on at least one surface of the current collector, where the positive electrode active material layer includes the positive electrode active material described herein.

A fifth aspect of this application provides a lithium-ion secondary battery, including the positive electrode active material or the positive electrode plate described herein.

A sixth aspect of this application provides a battery module, including any positive electrode active material described in the foregoing first aspect or third aspect, or any positive electrode plate described in the foregoing fourth aspect, or the lithium-ion secondary battery described in the foregoing fifth aspect.

A seventh aspect of this application provides a battery pack, including the battery module described in the foregoing sixth aspect.

An eighth aspect of this application provides an apparatus, including the lithium-ion secondary battery described in the foregoing fifth aspect, or the battery module described in the foregoing sixth aspect, or the battery pack described in the foregoing seventh aspect.

The inventor has found that, with the technical solutions of this application, the improved high/low-temperature cycling performance and swelling resistance performance can be obtained, and high energy density can be achieved. Particularly, the primary particles are regular primary particles and are arranged radially from the center of the secondary particle to the periphery thereof.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application. A person of ordinary skill in the art may still derive other drawings from the accompanying drawings without creative efforts.

DESCRIPTION OF EMBODIMENTS

In the specification and claims, the term "contain" and its variations are not intended for limitation.

The terms "optional" and "optionally" refer to embodiments of this application that can provide some advantages under some circumstances. However, under the same or other conditions, other embodiments may also be optional. In addition, the description of one or more optional embodiments does not mean that other embodiments are useless, and is not intended to exclude other embodiments within the scope of this application.

When used herein, "a", "one", "at least one", "one or more", and situations where quantifiers are not used can be interchanged. Therefore, for example, a composition containing additives can be interpreted as that the composition contains "one or more" additives.

As used herein, the term "or" is inclusive; that is, the term "A or B" means "A, B, or both A and B", or may be referred to as "A and/or B". More specifically, any of the following conditions satisfies the condition "A or B": A is true (or present) and B is false (or not present); A is false (or not present) and B is true (or present); or both A and B are true (or present). The exclusive "or" is represented herein by, for example, the terms such as "either A or B" and "one of A or B".

In the description of this specification, it should be noted that, unless otherwise stated, "above" and "below" means inclusion of the number itself, "more types" in "one or more types" means at least two types, and "a plurality" in "one or a plurality" means at least two.

In this specification, when describing a primary particle, the term "regular" or "regular primary particle" means that a cross section through the center (or center of gravity) of the particle and parallel to the largest surface has at least two parallel sides. In most cases (for example, in a lath-shaped particle), the cross section through the center (or center of gravity) of the particle and parallel to the largest surface is a quadrilateral with at least two parallel sides. For example, the cross section is in any of the shapes shown in FIG. 2.

Figure 1:
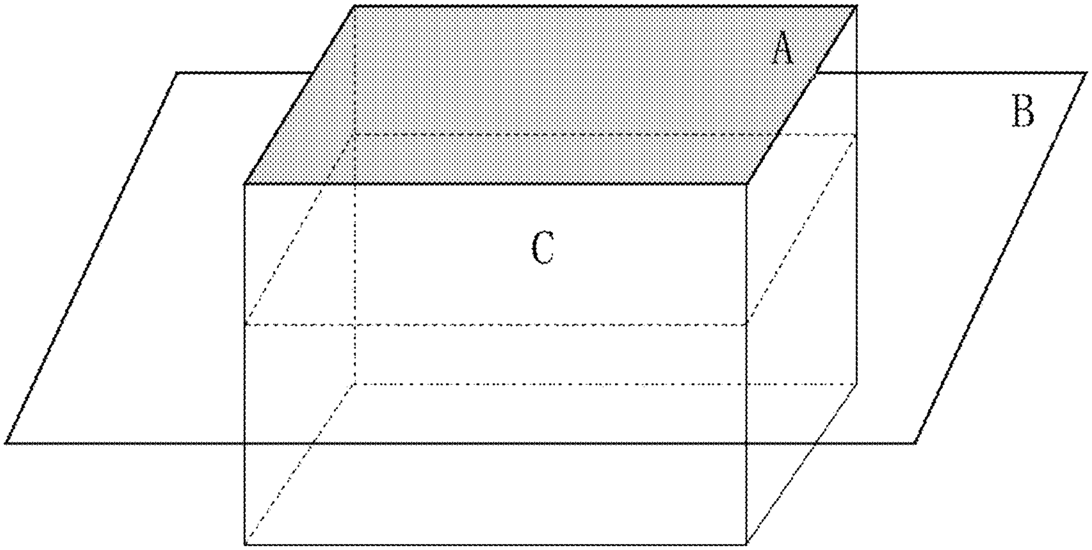
FIG. 1 shows an example cross section of a primary particle.
Figure 2:
FIG. 2 shows example quadrilaterals of three typical cross sections of a primary particle.

When describing the primary particle, the term "lath-shaped" means that the particle is plate-shaped or stripshaped. Optionally, the cross section of the lath-shaped primary particle is a quadrilateral. For the primary particle located on the surface of a secondary particle, the cross section of the lath-shaped primary particle parallel to the outermost surface of the primary particle is a quadrilateral. When the foregoing cross section is a quadrilateral with at least two parallel sides, the lath-shaped primary particle can be said to be regular. FIG. 1 shows an example cross section used to determine whether a primary particle is a lath-shaped primary particle. FIG. 2 shows example quadrilaterals of three typical cross sections of a primary particle.

The above content of this application is not intended to describe each disclosed embodiment or each implementation in this application. The description below more specifically illustrates example embodiments and optional solutions. Throughout this application, these embodiments and optional solutions can be used in various combinations. In various examples, the examples listed are only a representative group and shall not be interpreted as exhaustive.

The inventor has found that in the existing related solutions, doping and coating methods are usually used to improve structural stability of a material, reduce the content of lithium impurity and pH of a material, and improve cycling performance and swelling resistance performance of a nickel-rich ternary battery. However, the high-temperature cycling and swelling resistance performance of the nickel-rich ternary battery have not been well resolved so far. There are still problems such as poor high-temperature cycling performance, large increase of DCR during cycling, and severe swelling.

Therefore, there is an urgent need to develop a positive electrode active material which has improved high/low-temperature cycling performance and swelling resistance performance as well as high energy density.

One objective of this application is to provide a positive electrode active material having improved high/low-temperature cycling performance.

Another objective of this application is to provide a positive electrode active material having improved swelling resistance performance.

Yet another objective of this application is to provide a positive electrode active material having high energy density.

The inventor has found that one or more of the foregoing objectives can be achieved by using the technical solutions of this application.

Various aspects of this application will be described in detail below.

Positive Electrode Active Material

A first aspect of this application provides a positive electrode active material, including a composite oxide of lithium, boron, and a transition metal element.

The positive electrode active material of this application is rich in nickel. Generally, a positive electrode active material with high nickel content has a high battery capacity. However, the positive electrode active material with high nickel content may result in a decrease in the cycling performance and swelling resistance performance. The inventor has found that a balance between the capacity, the cycling performance, and the swelling resistance performance may be achieved by selecting appropriate combinations of parameters (which will be described in detail below). In the positive electrode active material of this application, a molar ratio of element nickel to element lithium ranges from 0.55 to 0.95. Optionally, the molar ratio of element nickel to element lithium ranges from 0.6 to 0.90, and further optionally from 0.63 to 0.85, for example, about 0.65, about 0.70, about 0.75, or about 0.80. In some embodiments, a molar content of element nickel in the transition metal element ranges from 0.65 to 1. Optionally, a molar content of element nickel in the transition metal element ranges from about 0.7 to about 0.9, for example, about 0.8, 0.85, and 0.88.

The positive electrode active material includes secondary particles having primary particles. The secondary particle is substantially formed by the primary particles gathering together, and is spherical or quasi-spherical. For example, the secondary particle may be ellipsoidal, pear-shaped, or the like. The primary particle includes a composite oxide having a layered crystal structure.

Optionally, the positive electrode active material includes secondary particles having lath-shaped primary particles. In an embodiment of this application, most (for example, at least 70%) of primary particles are regular. Optionally, the primary particle has a lath shape which can be distinguished in an SEM image. Specifically, among the primary particles in an outer layer of the secondary particle, 70% or more of the primary particles are lath-shaped primary particles. Further optionally, 75% or more of the primary particles are lath-shaped primary particles. Even further optionally, 80% or more of the primary particles are lath-shaped primary particles.

FIG. 1 shows a cross section used to determine whether a primary particle is a lath-shaped primary particle. Surface A represents an outer surface of the primary particle, or a surface parallel to a length of the primary particle. Plane B represents a plane that is parallel to or substantially parallel to surface A. Cross section C represents a cross section of the primary particle in plane B. With reference to FIG. 1, a person of ordinary skill in the art can properly determine a cross section, on a plane parallel to the outermost surface, of the primary particle.

Generally, the lath-shaped primary particle may be a cuboid, a cube, a flat plate, an oblique cuboid, or the like. Optionally, the cross section of the lath-shaped primary particle may be a regular quadrilateral or a quadrilateral with two parallel sides.

Optionally, for 60% or more of the primary particles in the outer layer of the secondary particle, a cross section, on a plane parallel to the outermost surface, of the primary particle is a quadrilateral with at least two parallel sides. Further optionally, for 65% or more of the primary particles, a cross section, on a plane parallel to the outermost surface, of the primary particle is a quadrilateral with at least two parallel sides. Even further optionally, for 70% or more of the primary particles, a cross section, on a plane parallel to the outermost surface, of the primary particle is a quadrilateral with at least two parallel sides.

FIG. 2 shows quadrilaterals of three typical cross sections of a primary particle, including a rectangle, a rhombus, and a trapezoid. It should be noted that the shapes described herein are approximate shapes, not necessarily the exact shapes. For example, a lath-shaped primary particle with a rectangular cross-section has a rectangle or rectangle-like shape. Based on the description and accompanying drawings herein, a person skilled in the art can properly determine the meaning of the "lath-shaped" primary particle.

Optionally, among the primary particles in an outer layer of the secondary particle, 70% or more, optionally 75% or more, further optionally 80% or more, and even further optionally 85% or more of the primary particles each have at least two parallel sides.

In some optional embodiments, in a cross section through the center of the secondary particle, 60% or more, optionally 65% or more, and further optionally 70% or more of the primary particles each have at least two parallel sides.

In an embodiment of this application, (at least 50%, optionally 60%, and even further optionally at least 70% of) the primary particles in a cross section of the secondary particle are substantially arranged radially from the center of the secondary particle to the periphery thereof.

A person skilled in the art can properly understand the meaning of being "arranged radially" and its representation method. For example, in some optional embodiments, an average value of an acute angle formed between a length direction of the primary particle and a diameter direction of a position of the primary particle is less than 20 degrees, optionally less than 15 degrees, and further optionally less than 10 degrees. In some optional embodiments, a radial orientation degree of the primary particles in the secondary particle is at least 50%, optionally at least 60%, further optionally at least 70%, even further optionally 80%, and most optionally at least 90%.

The inventor has found that, generally, with the lath-shaped primary particles having specified characteristics described in this specification, the positive electrode active material can have excellent structural stability and cycling performance, thereby improving swelling resistance performance and safety performance. Particularly, in an optional embodiment of this application, a channel for lithium ions to diffuse from inside out can be formed inside the primary particles that are in radial arrangement in the secondary particle, so that excellent rate performance can be achieved. This structure is conductive to intercalation and deintercalation of lithium ions, making the granular structure more stable, and greatly improving electrochemical performance of the material.

In some optional embodiments, an average length of quadrilaterals each having at least two parallel sides ranges from 100 nm to 2000 nm, optionally from 400 nm to 1500 nm, and further optionally from 500 nm to 1200 nm. In some optional embodiments, an average width of the primary particles ranges from 20 nm to 600 nm, optionally from 40 nm to 500 nm, and further optionally from 50 nm to 400 nm.

In some optional embodiments, an average length-width ratio of the primary particles ranges from 1:1 to 20:1, and optionally from 2:1 to 15:1. Further optionally, the average length-width ratio ranges from 3:1 to 12:1. Even further optionally, the average length-width ratio ranges from 4:1 to 10:1. For example, the average length-width ratio is about 4.2:1, 5:1, 6:1, 7:1, 8:1, or 9:1. With the quadrilateral within the foregoing optional ranges, performance of the positive electrode active material can be further improved.

Optionally, an average particle size D50 of the secondary particles ranges from 5 μm to 20 μm. For example, D50 may be about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, or about 19 μm. This is conducive to the electrochemical performance of the positive electrode active material, thereby facilitating improvement of the capacity, energy density, rate performance, and cycling performance of a battery. As is well known in the art, the average particle size D50 is used to indicate a size of a particle, and its physical meaning is a corresponding particle size when a cumulative particle size distribution percentage reaches 50%. D50 may be measured by methods and instruments well known in the art, for example, may be measured conveniently by using a laser particle size analyzer (for example, Malvern Mastersizer 3000).

A specific surface area of the positive electrode active material ranges from 0.2 $m^2/g$ to 1.2 $m^2/g$, and optionally from 0.3 $m^2/g$ to 1.0 $m^2/g$. Particularly optionally, a specific surface area is about 0.4 $m^2/g$, 0.5 $m^2/g$, 0.6 $m^2/g$, 0.8 $m^2/g$, or 0.9 $m^2/g$. This is conductive to improvement of the capacity, energy density, cycling performance, and rate performance of a lithium-ion secondary battery.

Herein, mass concentration of element M1 at any site of the secondary particle is mass concentration of element M1 in all elements in the very small volume of this site, which may be obtained by testing the element concentration distribution through EDX (Energy Dispersive X-Ray Spectroscopy, energy dispersive X-ray spectroscopy) or EDS element analysis in combination with TEM (Transmission Electron Microscope, transmission electron microscope) or SEM (Scanning Electron Microscope, scanning electron microscope) single-point scanning, or in other similar manners. When testing is performed through EDX or EDS element analysis in combination with TEM or SEM single-point scanning, mass concentration of element M1 measured in μg/g at different sites in the bulk particle is denoted as $\eta 1$, $\eta 2$, $\eta 3$, . . . $\eta n$, where n is a positive integer greater than or equal to 15.

Average mass concentration of element M1 in the secondary particle is mass concentration of element M1 in all elements within a single secondary particle, and can be obtained by testing the element concentration distribution through EDX or EDS element analysis in combination with TEM or SEM plane scanning, or in other similar manners. When the element concentration distribution is tested through EDX or EDS element analysis in combination with the TEM or SEM plane scanning, a test plane includes all points in the foregoing single-point test. The average mass concentration of element M1 in the secondary particle is denoted as $\bar{\eta}$, measured in μg/g.

Uniformity 6 of element M1 in the secondary particle is calculated according to the following formula (1):

$$\sigma = \frac{\max\{|\eta_1 - \bar{\eta}|, |\eta_2 - \bar{\eta}|, |\eta_3 - \bar{\eta}|, \ldots, |\eta_n - \bar{\eta}|\}}{\bar{\eta}}. \quad \text{formula1}$$

Herein, the uniformity of element M1 in the secondary particle is 20% or less, and optionally 15% or less. The more uniform distribution of element M1 in the secondary particle means better overall performance of a battery.

The positive electrode active material in this specification includes active material bulk particles and a coating layer covering the outer surface of each active material bulk particle. In some embodiments, the active material bulk particles are doped with other metal elements, transition metal elements, or non-metallic elements. The inventor has found that simple doping in the prior art can only improve the structural stability of a material; and simple coating can only reduce a negative reaction between the material and an electrolyte, and does not have much effect on improving the layered crystal structure of the material and a lithium ion channel. Surprisingly, the positive electrode active material of this application greatly improves regularity of the crystal structure of the primary particles, so that the primary particles are basically still in "radial arrangement", thereby improving the high-temperature cycling performance of a nickel-rich battery and reducing an increase of DCR during cycling.

Optionally, the active material bulk particles are doped with element M1, where element M1 is one or more of Zr, Ti, Te, Al, Ca, Si, Sb, Nb, Pb, V, Ge, Se, W, and Mo. Further optionally, element M1 is one or more of Zr, Ti, Te, Ca, Sb, Nb, W, and Mo. In some embodiments, a doping amount of element M1 ranges from 100 ppm to 6000 ppm. Optionally, the doping amount of M1 ranges from 400 ppm to 5000 ppm. For example, the doping amount of element M1 is about 500 ppm, 1000 ppm, 2000 ppm, 2500 ppm, 3000 ppm, 3500 ppm, or 4000 ppm. Particularly optionally, the doping amount of M1 ranges from 1000 ppm to 2000 ppm.

Optionally, element M1 is relatively evenly distributed inside the active material bulk particle. For example, a concentration change rate of element M1 inside the active material bulk particle is less than or equal to 25%. Further optionally, a concentration change rate of element M1 inside the active material bulk particle is less than or equal to 20%.

In some optional embodiments, the coating layer contains element M2. Optionally, a thickness of the coating layer ranges from 0.001 μm to 0.2 μm, and further optionally, a thickness of the coating layer ranges from 0.01 μm to 0.15 μm. For example, the thickness of the coating layer is 0.02 μm, 0.04 μm, 0.06 μm, 0.08 μm, 0.1 μm, 0.12 μm, or 0.14 μm.

Optionally, element M2 is one or more of Mg, Zn, Al, Ce, Ti, and Zr. In some embodiments, a doping amount of element M2 ranges from 50 ppm to 6000 ppm. Optionally, the doping amount of element M2 ranges from 100 ppm to 5000 ppm. For example, the doping amount of M2 is about 200 ppm, 500 ppm, 1000 ppm, 2000 ppm, 2500 ppm, 3000 ppm, 3500 ppm, or 4000 ppm. Particularly optionally, the doping amount of M2 ranges from 1000 ppm to 2000 ppm.

In some optional embodiments, a concentration ratio of element M1 to element M2 ranges from 1:50 to 50:1. Further optionally, the concentration ratio of element M1 to element M2 ranges from 1:20 to 30:1. Further optionally, the concentration ratio of element M1 to element M2 ranges from 1:10 to 20:1.

The inventor has found that, by adjusting the ratio of element M1 to element B, a balance between the cycling performance and the swelling resistance performance can be further achieved, with high battery capacity maintained. Optionally, the ratio of element M1 to element B ranges from 0.3:1 to 3:1, further optionally from 0.4:1 to 2.5:1, and even further optionally from 0.5:1 to 2:1. For example, the ratio of element M1 to element B may be about 0.5:1, 0.6:1, 0.7:1, 0.8:1, 1:1, 1.2:1, 1.3:1, 1.5:1, 1.6:1, or 1.8:1.

In some optional embodiments, the active material bulk particle of the positive electrode active material contains element B. The advantage is that the primary particles in the secondary particle of the obtained positive electrode active material are in significant radial arrangement, so that a precursor structure can be maintained or even improved to most extent, and a channel for lithium ions to diffuse from inside out is formed inside the secondary particle.

Optionally, concentration of element B ranges from 50 ppm to 5000 ppm. Further optionally, the concentration of element B ranges from 100 ppm to 4500 ppm. For example, the concentration of element B is about 200 ppm, 500 ppm, 1000 ppm, 2000 ppm, 2500 ppm, 3000 ppm, 3500 ppm, or 4000 ppm. In some optional embodiments, a concentration ratio of element M1 to element B ranges from 1:50 to 80:1. Further optionally, the concentration ratio of element M1 to element B ranges from 1:20 to 50:1. Further optionally, the concentration ratio of element M1 to element B ranges from 1:10 to 40:1. The inventor has found that by adjusting the concentration of element B, the ratio and length-width ratio of the lath-shaped primary particles can be adjusted, so that the lath-shaped primary particles with the desired ratio and length-width ratio are obtained. In this way, the microscopic morphology of the positive electrode active material can be advantageously improved, thereby greatly improving the stability, swelling resistance performance, and cycling performance of the active material.

In addition, further optionally, both a concentration ratio of element M1 to element B and a concentration ratio of element M2 to element B range from 0.5:1 to 2:1. Within the foregoing optional ratio range, the ratio and radial distribution of the lath-shaped primary particles inside the secondary particle can be further improved, thereby obtaining an active material and battery with better stability, swelling resistance, and cycling performance.

In some optional embodiments, the positive electrode active material includes a composite oxide of lithium, boron, and a transition metal element. The composite oxide may be expressed by chemical formula $Li_{1+a}MeB_bO_2$, where $0<a<0.2$, and $0<b<0.1$. Element Me may be one or more transition metal elements selected from Ni, Co, and Mn, or a part of element Me may be substituted with element A. Element A may be, for example, one or more of Mg, Zr, Ti, Te, Al, Ca, Si, Sb, Nb, Pb, V, Ge, Se, W, Mo, Ce, and Zn.

In some embodiments, a molar ratio of element Me to element Li, Me:Li, in the positive electrode active material may range from 1:0.99 to 1:1.2, further, Me:Li=1:1 to 1:1.15, and even further, Me:Li=1:1.02 to 1:1.12. For example, Me:Li may be 1:1.05, 1:1.06, 1:1.08, or 1:1.1. In some embodiments, for ease of calculation, a molar mass of Me may be approximately equal to a molar mass of (Ni+Co+Mn).

In some optional embodiments, the composite oxide has a molecular formula shown in formula (1):

$$Li_{1+a}[Ni_xCo_yMn_zB_bM1M2_d]O_2 \quad \text{formula (1)},$$

where $0.65<x<1$, $0<y<0.3$, $0<z<0.3$, $0<a<0.2$, $0<b<0.1$, $0<c<0.1$, $0<d<0.1$, and $x+y+z+b+c+d=1$.

Further optionally, $0.7\leq x\leq 0.8$. Further optionally, $0.05\leq y\leq 0.2$. Further optionally, $0.03\leq y\leq 0.2$. Particularly optionally, the composite oxide may be formed by a precursor $[Ni_xCo_yMn_z](OH)_2$, where $0.65<x<1$, $0<y<0.3$, and $0<z<0.3$. For example, the precursor $[Ni_xCo_yMn_z](OH)_2$ may be formed by $[Ni_{0.8}Co_{0.1}Mn_{0.1}](OH)_2$, $[Ni_{0.7}Co_{0.15}Mn_{0.15}](OH)_2$ or $[Ni_{0.85}Co_{0.10}Mn_{0.05}](OH)_2$.

The inventor has surprisingly found that containing regular lath-shaped primary particles, the positive electrode active material of this application achieves excellent high-temperature cycling performance, low-temperature cycling performance, and swelling resistance performance, as well as high energy density. In addition, the specified structure combining doping and coating characteristics not only allows the positive electrode active material to have high structural stability, but also reduces side reactions of an electrolyte on the surface of the positive electrode active material, thereby improving swelling resistance performance of a battery, reducing battery polarization, and improving cycling performance and capacity density. More importantly, in the positive electrode active material of this application, the lath-shaped primary particles and the specified structure combining doping and coating characteristics jointly promote optimization of the positive electrode active material, further improve the cycling performance and stability of the positive electrode active material, and further improve the energy density. This is unexpected by a person skilled in the art.

Furthermore, a button cell prepared by using the positive electrode active material of this application has a specific capacity of above 216 mAh/g at 0.1 C. A specific capacity of a full cell prepared by using the positive electrode active material of this application can still be kept above 90% after 1200 cycles at 1 C/1 C at room temperature.

Preparation Method of Positive Electrode Active Material

A second aspect of this application provides a preparation method of positive electrode active material. The method includes the following steps.

(1) mixing an active material precursor, a lithium-containing compound, a boron-containing compound, and an M1-containing compound, and performing sintering to obtain a positive electrode active material matrix having lath-shaped primary particles; and (2) mixing the positive electrode active material matrix and an M2-containing compound, and performing sintering to obtain a positive electrode active material coated with an M2 oxide coating on the surface.

A ball mill mixer or a high-speed mixer may be used for mixing. In an example, a precursor that contains transition metal, a lithium-containing compound, a boron-containing compound, and an M1-containing compound are added into a high-speed mixer and mixed for 0.5 h to 2 h.

The preferred solutions and characteristics of the positive electrode active material described above are also applicable to the method according to the second aspect of this application. For example, element M1 is one or more of Zr, Ti, Te, Al, Ca, Si, Sb, Nb, Pb, V, Ge, Se, W, and Mo, and element M1 is doped inside the positive electrode active material matrix; the active material precursor contains element nickel; a molar ratio of element nickel to element lithium ranges from 0.55 to 0.95; and element M2 is one or more of Mg, Zn, Al, Ce, Ti, and Zr.

For example, in some optional embodiments, the precursor is $[Ni_xCo_yMn_z](OH)_2$, where $0.65<x<1$, $0<y<0.3$, and $0<z<0.3$. Further optionally, the precursor may be $[Ni_{0.8}Co_{0.1}Mn_{0.1}](OH)_2$, $[Ni_{0.7}Co_{0.15}Mn_{0.15}](OH)_2$ or $[Ni_{0.85}Co_{0.10}Mn_{0.05}](OH)_2$.

$[Ni_xCo_yMn_z](OH)_2$ may be obtained by using the methods known in the art. In an example, a Ni source, a Co source, and an Mn source are dispersed in a solvent to obtain a mixed solution; the mixed solution, a strong alkali solution, and a complexing agent solution are all pumped into a stirring reactor through continuous co-current reactions, where a pH value of the reaction solution is controlled to be 10 to 13, a temperature in the reactor is 25° C. to 90° C., and an inert gas is introduced for protection during the reaction; and after reaction is completed, aging, filtering, washing and vacuum drying are performed to obtain $[Ni_xCo_yMn_z](OH)_2$. The Ni source may be one or more of nickel chloride, nickel sulfate, nickel nitrate, nickel oxide, nickel hydroxide, nickel fluoride, nickel carbonate, nickel phosphate, and an organic compound of nickel; the Co source may be one or more of cobalt chloride, cobalt sulfate, cobalt nitrate, cobalt oxide, cobalt hydroxide, cobalt fluoride, cobalt carbonate, cobalt phosphate, and an organic compound of cobalt; the Mn source may be one or more of manganese chloride, manganese sulfate, manganese nitrate, manganese oxide, manganese hydroxide, manganese fluoride, manganese carbonate, manganese phosphate, and an organic compound of manganese; the strong alkali may be one or both of sodium hydroxide and potassium hydroxide; and the complexing agent may be one or both of ammonia and oxalic acid. But they are not limited to these materials.

The lithium-containing compound may be one or more of lithium oxide ($Li_2O$), lithium phosphate ($Li_3PO_4$), lithium dihydrogen phosphate ($LiH_2PO_4$), lithium acetate ($CH_3COOLi$), lithium hydroxide (LiOH), lithium carbonate ($Li_2CO_3$), and lithium nitrate ($LiNO_3$), but is not limited thereto. Optionally, lithium hydroxide may be used as a lithium-containing compound.

The boron-containing compound may be one or more of $BCl_3$, $B_2(SO_4)_3$, $B(NO_3)_3$, BN, $B_2O_3$, $BF_3$, $BBr_3$, $BI_3$, $H_2BO_5P$, $H_3BO_3$, $C_5H_6B(OH)_2$, $C_3H_9B_3O_6$, $(C_2H_3O)_3B$, and $(C_3H_7O)_3B$.

The M1-containing compound may be one or more of chloride, sulfate, nitrate, oxide, hydroxide, fluoride, carbonate, phosphate, dihydric phosphate, and organic compound that contain element M1, but is not limited thereto. For example, in some embodiments, one or more of calcium oxide, titanium oxide, and zirconium oxide may be used as an M2-containing compound.

The M2-containing compound may be one or more of chloride, sulfate, nitrate, oxide, hydroxide, fluoride, carbonate, phosphate, dihydric phosphate, and organic compound that contain element M2, but is not limited thereto. Optionally, chloride and oxide that contain M2 element may be used. For example, in some embodiments, one or more of aluminum oxide, magnesium oxide, titanium oxide, and zirconium oxide may be used as an M2-containing compound.

The sintering in step (1) and step (2) may be performed in an atmosphere sintering furnace. Optionally, a sintering atmosphere is an air atmosphere or an oxygen atmosphere, and further optionally an oxygen atmosphere. In some embodiments, oxygen concentration in the oxygen atmosphere may range from 50% to 100%, and further optionally from 80% to 100%.

In some optional embodiments, the sintering temperature in step (1) ranges from 700° C. to 1000° C., and optionally from 750° C. to 950° C. For example, the sintering in step (1) may be performed at 830° C., 850° C., 900° C., or 930° C. In step (1), a sintering time is optionally 7 h to 25 h, and further optionally 10 h to 22 h. During the sintering process, element M1 diffuses from the outer surface of the particle to the bulk phase, thereby improving the structural stability of the active material bulk particle. Because element M1, element lithium, element boron, and a precursor are all present in a formation process of the active material matrix, element M1 is relatively uniformly distributed inside the active material matrix. The active material matrix has the lath-shaped primary particles bulk doped with element M1. Based on the sintering temperature and sintering time within the foregoing optional ranges, the lath-shaped primary particles that are more evenly bulk doped with element M1 can be obtained, further improving the structural stability and swelling resistance performance of the positive electrode active material, reducing an increase of DCR during cycling, and achieving a high specific capacity.

In some optional embodiments, the sintering temperature in step (2) may be 180° C. or higher, and optionally 200° C. or higher. In some optional embodiments, the sintering temperature in step (2) may be 700° C. or lower, and optionally 650° C. or lower. For example, the sintering in step (2) may be performed at 250° C., 300° C., 400° C., or 500° C. In step (2), the sintering time is 3 h to 10 h, and optionally 5 h to 10 h. During the sintering process, an oxide that contains element M2 mainly covers the surface of the bulk particle of the active material, and has rarely or never diffused into the bulk particle of the active material. The formed coating layer well protects the surface of the bulk particle of the active material, isolates the active material bulk particle from an electrolyte, and avoids a side reaction between the active material bulk particle and the electrolyte, thereby improving the cycling performance and safety performance of a lithium-ion secondary battery, particularly the safety performance and cycling performance of the lithium-ion secondary battery at high temperature.

By controlling the sintering temperature in step (1) and step (2), the proportion and shape of the lath-shaped primary particle can be adjusted. When the temperature is too high or too low, the proportion of lath-shaped primary particles may also decrease, with the capacity and cycling performance deteriorated.

Optionally, the method of this application may further include the following steps:

between step (1) and step (2), washing the positive electrode active material matrix having lath-shaped primary particles in a solution, and performing drying.

With the washing process, the swelling resistance performance can be further improved, and residual lithium on the surface of the particle can be greatly reduced.

The solution may contain one or both of deionized water and ethanol. Alternatively, the solution may be one or both of deionized water and ethanol. A mixed solution of ethanol and water in any ratio may be used. For example, in some embodiments, a mixed solution of ethanol and water in a ratio of 1:1 may be used.

Washing may be performed by using a washing kettle with the stirring function. The solution and the positive electrode active material matrix are added to the washing kettle for washing, where a weight ratio of the positive electrode active material matrix to the solution (hereinafter referred to as a solid-to-liquid ratio) is optionally 1:0.2 or higher, and further optionally 1:0.5 or higher. The weight ratio of the positive electrode active material matrix to the solution (hereinafter referred to as a solid-to-liquid ratio) is optionally 1:10 or lower, and further optionally 1:5 or lower. The washing temperature may range from 10° C. to 50° C., and optionally from 20° C. to 40° C. The washing time may range from 1 min to 1.5 h, and optionally from 2 min to 60 min, for example, 30 min. During washing, a stirring speed may range from 10 r/min to 500 r/min, and optionally from 20 r/min to 200 r/min. After washing, materials are separated through centrifugation to obtain a washed positive electrode active material matrix. Then, drying may be performed, for example, in a vacuum environment. In some embodiments, drying is performed in a vacuum drying oven. A drying temperature may range from 80° C. to 150° C., and optionally from 90° C. to 120° C. A drying time may be from 2 h to 20 h, and optionally from 5 h to 10 h.

Through washing with a solution of the boron-containing compound, residual lithium of the material can be greatly reduced to below 1000 ppm, and optionally below 800 ppm.

With the foregoing methods, the positive electrode active material having lath-shaped primary particles is effectively prepared. With the foregoing optional solutions, the microcosmic morphology and performance of the positive electrode active material can be further improved. Particularly, as described above, the inventor has found that by adjusting the concentration of element B, the ratio and length-width ratio of the lath-shaped primary particles can be adjusted, so that the lath-shaped primary particles with the desired ratio and length-width ratio are obtained. In this way, the microscopic morphology of the positive electrode active material can be advantageously improved, thereby greatly improving the stability, swelling resistance performance, and cycling performance of the active material.

In the method of this application, bulk doping and outer coating of the primary particles are well implemented through secondary sintering, so that the specific capacity and cycling performance are improved greatly and the swelling is effectively reduced.

It should be noted that, in the prior-art method, even if the precursor itself has a radial structure, the radial structure is usually damaged during preparation of the positive electrode active material. In the case of a severe damage, in the prepared positive electrode active material, the crystal structure of the primary particles becomes irregular or finer, and the primary particles are randomly distributed in the secondary particle. Therefore, it is difficult to obtain primary particles having a regular structure and/or in radial arrangement in the final positive electrode active material by using the prior-art methods.

A third aspect of this application provides a positive electrode active material which is prepared by using any of the foregoing preparation method.

Positive Electrode Plate

A fourth aspect of this application provides a positive electrode plate. The positive electrode plate includes a current collector and a positive electrode active material layer disposed on at least one surface of the current collector, where the positive electrode active material layer includes the positive electrode active material provided in the first aspect or the third aspect of the embodiments of this application.

The current collector may be made of a metal foil, a carbon-coated metal foil, or a porous metal plate, such as an aluminum foil.

Further, a positive electrode membrane optionally includes a conductive agent and a binder. Solvents and other additives, such as N-methylpyrrolidone (NMP) and a PTC thermistor material, may also be added into an active material of the positive electrode plate according to needs.

In this application, the type and amount of the conductive agent and the binder are not specifically limited and may be selected according to actual needs.

An appropriate example of the conductive agent includes, but is not limited to, graphite, such as natural graphite or artificial graphite; graphene; a carbon black material, such as carbon black, Super P, acetylene black, or Ketjen black; conductive fibers, such as carbon fibers, metal fibers, or carbon nanotube conductive fibers; metal powder, such as aluminum or nickel powder; conductive whiskers, such as zinc oxide and potassium titanate; conductive metal oxide, such as iron oxide; polyphenylene derivatives; and any combination thereof. In the positive electrode plate active material layer of a battery, a weight of the conductive agent may be 0% to 4%, and optionally 1% to 3%, of the total weight of the positive electrode plate active material layer.

The binder is selected from at least one or more of polyvinylidene fluoride-hexafluoropropylene copolymer (PVDF-co-HEP), polyvinylidene fluoride, polyacrylonitrile, polymethyl methacrylate, polyvinyl alcohol, carboxymethyl cellulose (CMC), starch, hydroxypropyl fiber, regenerated cellulose, polyvinylpyrrolidone, polytetrafluoroethylene, polyethylene, polypropylene, polyacrylic acid, styrene-butadiene rubber (SBR), fluorinated rubber, ethylene-vinyl acetate copolymer, polyurethane, and copolymers thereof. In the positive electrode plate active material layer of the battery, a weight of the binder may be 0% to 4%, and optionally 1% to 3%, of the total weight of the positive electrode plate active material layer.

The positive electrode plate may be prepared by using the conventional methods in the art. For example, generally, a positive electrode active material and the optional conductive agent and binder are dissolved in a solvent (for example, N-methylpyrrolidone, NMP for short) to form a uniform positive electrode slurry; the positive electrode slurry is applied onto a positive electrode current collector, and processes such as drying and rolling are performed to obtain the positive electrode plate.

Lithium-Ion Secondary Battery

A fifth aspect of this application provides a lithium-ion secondary battery, including the positive electrode active material or the positive electrode plate described herein.

In addition to the positive electrode plate, the lithium-ion secondary battery may also include a negative electrode plate, a separator, and an electrolyte.

The negative electrode plate may be a lithium metal sheet. The negative electrode plate may also include a negative electrode current collector and a negative electrode membrane applied on the negative electrode current collector. The negative electrode current collector may be made of a metal foil, a carbon-coated metal foil, or a porous metal plate, such as a copper foil.

The negative electrode plate generally includes a negative electrode active material and an optional conductive agent, binder, and thickener. The negative electrode plate is not specifically limited in this application. A person skilled in the art may make a reasonable choice according to actual requirements.

The negative electrode plate that includes the negative electrode current collector and the negative electrode membrane may be prepared by using the conventional methods in the art. Generally, the negative electrode active material and the optional conductive agent, binder and thickener are dissolved in a solvent which may be deionized water or NMP, to form a uniform negative electrode slurry; the negative electrode slurry is applied onto the negative electrode current collector, and processes such as drying and rolling are performed to obtain the negative electrode plate.

The specific type, thickness, and composition of the separator are not specifically limited, and may be selected based on actual needs. Specifically, the separator may be selected from a polyethylene film, a polypropylene film, a polyvinylidene fluoride film, non-woven fabrics, and a multilayer composite film thereof. When the separator is a multilayer composite film, each layer may be made of the same or different materials.

The electrolyte includes an organic solvent and an electrolyte salt, which is not specifically limited in this application and may be selected according to actual requirements.

In an example, the organic solvent may be one or more of ethylene carbonate (EC), propylene carbonate (PC), ethyl methyl carbonate (EMC), diethyl carbonate (DEC), and dimethyl carbonate (DMC). The electrolyte lithium salt may be one or more of lithium hexafluorophosphate ($LiPF_6$), lithium tetrafluoroborate ($LiBF_4$), lithium perchlorate ($LiClO_4$), lithium hexafluoroarsenate ($LiAsF_6$), lithium bis (fluorosulfonyl)imide (LiFSI), lithium bistrifluoromethanesulfonimide (LiTFSI), lithium trifluoromethanesulfonate (LiTFS), lithium difluoro(oxalato)borate (LiDFOB), lithium dioxalate borate (LiBOB), lithium difluorophosphate ($LiPO_2F_2$), lithium difluoro(dioxalato)phosphate (LiDFOP), and lithium tetrafluoro oxalato phosphate (LiTFOP).

The secondary battery of this application may be prepared by using the conventional methods in the art. For example, a negative electrode active material and the optional conductive agent and binder are dissolved in a solvent (for example, water) to form a uniform negative electrode slurry; the negative electrode slurry is applied onto the negative electrode current collector, and processes such as drying and cold pressing are performed to obtain a negative electrode plate. A positive electrode active material and the optional conductive agent and binder are dissolved in a solvent (for example, N-methylpyrrolidone, NMP for short) to form a uniform positive electrode slurry; the positive electrode slurry is applied onto a positive electrode current collector, and processes such as drying and cold pressing are performed to obtain a positive electrode plate. The positive electrode plate, the separator, and the negative electrode are wound (or stacked) in sequence, so that the separator is located between the positive electrode plate and the negative electrode plate for isolation, to obtain an electrode assembly. The electrode assembly is placed in an outer package, and an electrolyte is injected, to obtain a secondary battery.

In some embodiments, alternatively, the positive electrode plate, the separator, and the negative electrode plate may be stacked in sequence, so that the separator is located between the positive electrode plate and the negative electrode plate for isolation, to obtain a battery cell (also referred to as an electrode assembly), or the battery cell may be obtained through winding; the battery cell is placed in an outer package, and an electrolyte is injected, followed by sealing, to prepare a lithium-ion secondary battery.

Figure 13:
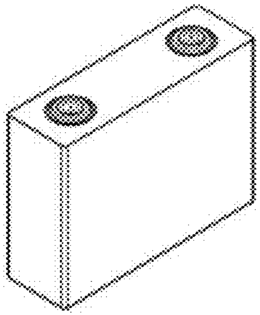
FIG. 13 is a schematic diagram of an embodiment of a secondary battery.

The lithium-ion secondary battery may be in various shapes and sizes, for example, may be cylindrical, prismatic, button-shaped, or bag-shaped. FIG. 13 shows a secondary battery 5 of a square structure as an example.

In some examples, the secondary battery may include an outer package. The outer package is used for packaging a positive electrode plate, a negative electrode plate, and an electrolyte.

Figure 14:
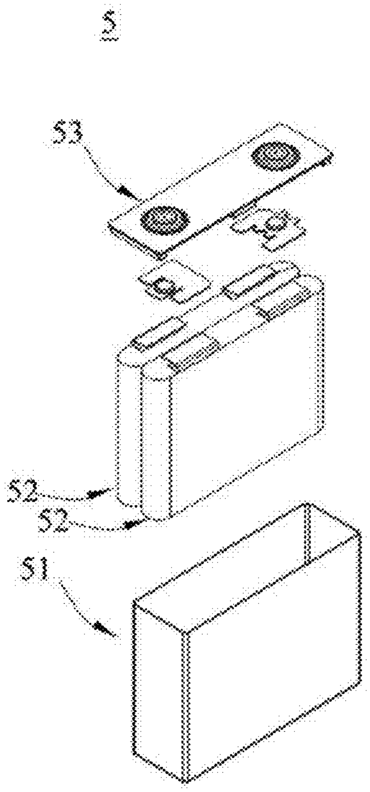
FIG. 14 is an exploded view of FIG. 13.

In some embodiments, referring to FIG. 14, the outer package may include a housing 51 and a cover plate 53. The housing 51 may include a base plate and a side plate connected onto the base plate, and the base plate and the side plate enclose an accommodating cavity. The housing 51 has an opening communicating with the accommodating cavity, and the cover plate 53 can cover the opening to close the accommodating cavity.

A positive electrode plate, a negative electrode plate, and a separator may be wound or laminated to form an electrode assembly 52. The electrode assembly 52 is packaged in the accommodating cavity. An electrolyte may be a liquid electrolyte, and the liquid electrode infiltrates the electrode assembly 52. There may be one or more electrode assemblies 52 in the secondary battery 5, and the quantity may be adjusted as required.

In some embodiments, the outer package of the secondary battery may be a hard shell, for example, a hard plastic shell, an aluminum shell, or a steel shell. The outer package of the secondary battery may alternatively be a soft shell, for example, a soft bag. A material of the soft package may be plastic, for example, may include one or more of polypropylene (PP), polybutylene terephthalate (PBT), polybutylene succinate (PBS), and the like.

In some embodiments, the lithium-ion secondary battery may be assembled into a battery module. The battery module may include a plurality of secondary batteries. The specific quantity may be adjusted according to the use case and capacity of the battery module.

Figure 15:
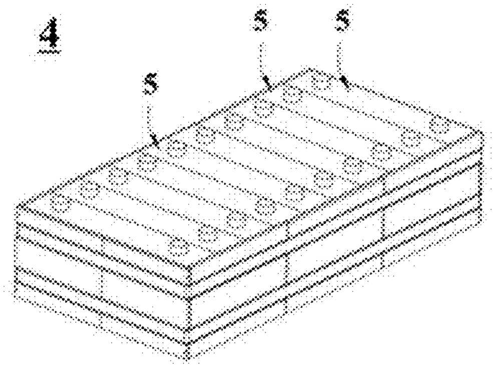
FIG. 15 is a schematic diagram of an embodiment of a battery module.

FIG. 15 shows a battery module 4 used as an example. Referring to FIG. 15, in the battery module 4, a plurality of secondary batteries 5 may be sequentially arranged in a length direction of the battery module 4. Certainly, the secondary batteries may alternatively be arranged in any other manner. Further, the plurality of secondary batteries 5 may be fastened through fasteners.

Optionally, the battery module 4 may further include a housing with an accommodating space, and the plurality of secondary batteries 5 are accommodated in the accommodating space.

In some embodiments, the foregoing battery module may be assembled into a battery pack. A quantity of battery modules in the battery pack may be adjusted based on application and capacity of the battery pack.

Figure 16:
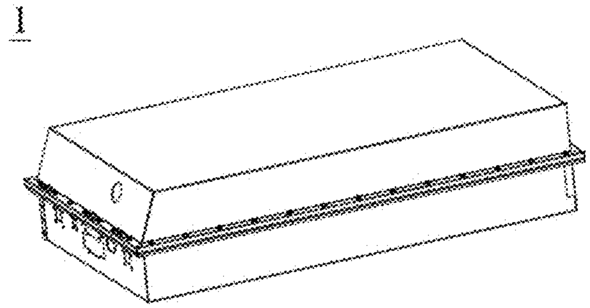
FIG. 16 is a schematic diagram of an embodiment of a battery pack.
Figure 17:
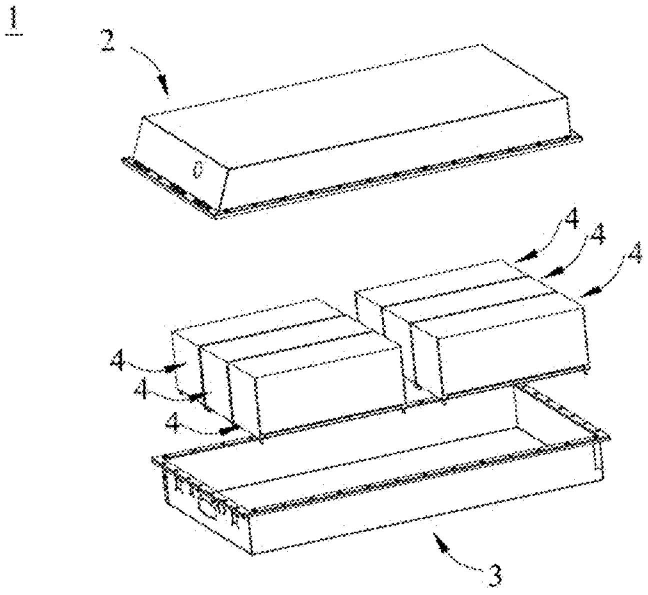
FIG. 17 is an exploded view of FIG. 16.

FIG. 16 and FIG. 17 show a battery pack 1 used as an example. Referring to FIG. 16 and FIG. 17, the battery pack 1 may include a battery box and a plurality of battery modules 4 arranged in the battery box. The battery box includes an upper box body 2 and a lower box body 3. The upper box body 2 can cover the lower box body 3 to form enclosed space for accommodating the battery modules 4. The plurality of battery modules 4 may be arranged in the battery box in any manner.

Apparatus

This application further provides an apparatus. The apparatus includes the secondary battery, the battery module, or the battery pack of this application. The secondary battery may be used as a power source of the apparatus, and may also be used as an energy storage unit of the apparatus. The apparatus may be, but is not limited to, a mobile device (for example, a mobile phone or a notebook computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, an energy storage system, or the like.

A secondary battery, a battery module, or a battery pack may be selected for the apparatus according to requirements for using the apparatus.

Figure 18:
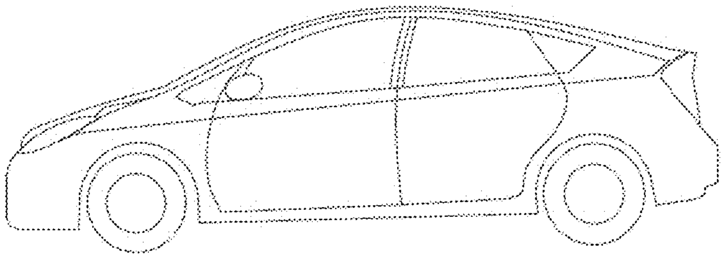
FIG. 18 is a schematic diagram of an embodiment of an apparatus using a secondary battery as a power source.

FIG. 18 shows an apparatus used as an example. The apparatus is a battery electric vehicle, a hybrid electric vehicle, a plug-in hybrid electric vehicle, or the like. To meet a requirement of the apparatus for high power and high energy density of the secondary battery, a battery pack or a battery module may be used.

In another example, the apparatus may be a mobile phone, a tablet computer, a notebook computer, or the like. The apparatus is usually required to be light and thin, and the secondary battery may be used as a power source.

To further illustrate some aspects of this application, this application also specifically provides the following non-limitative embodiments.

Embodiment 1: A positive electrode active material includes a composite oxide of lithium, boron, and a transition metal element, where the transition metal element includes element nickel, and a molar ratio of element nickel to element lithium ranges from 0.55 to 0.95; and the positive electrode active material includes secondary particles formed by regular primary particles.

Embodiment 2: The positive electrode active material according to Embodiment 1 has any one, two, three, or four of the following characteristics:

(1) at least 50%, optionally at least 60%, and further optionally 70%, of the primary particles in the secondary particle are arranged radially from the center of the secondary particles to the periphery;

(2) among the primary particles in the outer layer of the secondary particle, 70% or more, optionally 75% or more, further optionally 80% or more, and even further optionally 85% or more of the primary particles each have at least two parallel sides;

(3) on a cross section through the center of the secondary particle, 60% or more, optionally 65% or more, and further optionally 70% or more of the primary particles each have at least two parallel sides;

(4) an average value of an acute angle formed between a length direction of the primary particle and a diameter direction of a position of the primary particle is less than 20 degrees, optionally less than 15 degrees, and further optionally less than 10 degrees; and (5) a radial orientation degree of the primary particles in the secondary particle is at least 50%, optionally at least 60%, further optionally at least 70%, even further optionally 80%, and most optionally at least 90%.

Embodiment 3: In the positive electrode active material according to Embodiment 1, among the primary particles in the outer layer of the secondary particle, a cross section, parallel to the outermost surface, of each of 70% or more of the primary particles is a quadrilateral with at least two parallel sides.

Embodiment 4: In the positive electrode active material according to any of the foregoing embodiments, an average length of the primary particles ranges from 100 nm to 2000 nm, optionally from 400 nm to 1500 nm, and further optionally from 500 nm to 1200 nm.

Embodiment 5: In the positive electrode active material according to any of the foregoing embodiments, an average width of the primary particles ranges from 20 nm to 600 nm, optionally from 40 nm to 500 nm, and further optionally from 50 nm to 400 nm.

Embodiment 6: In the positive electrode active material according to any of the foregoing embodiments, an average length-width ratio of the primary particles ranges from 1:1 to 20:1, and optionally from 2:1 to 15:1.

Embodiment 7: The positive electrode active material according to any of the foregoing embodiments includes active material bulk particles doped with element M1 and a coating layer covering the outer surface of each active material bulk particle; the coating layer contains element M2; element M1 is one or more of Zr, Ti, Te, Al, Ca, Si, Sb, Nb, Pb, V, Ge, Se, W, and Mo; and element M2 is one or more of Mg, Zn, Al, Ce, Ti, and Zr.

Embodiment 8: In the positive electrode active material according to any of the foregoing embodiments, a specific surface area of the positive electrode active material ranges from 0.2 $m^2/g$ to 1.2 $m^2/g$, and optionally from 0.3 $m^2/g$ to 1.0 $m^2/g$; and D50 of the secondary particles ranges from 6 μm to 20 μm.

Embodiment 9: In the positive electrode active material according to Embodiment 7 or 8, concentration of element M1 ranges from 100 ppm to 6000 ppm.

Embodiment 10: In the positive electrode active material according to any one of Embodiments 7 to 9, concentration of element M2 ranges from 50 ppm to 6000 ppm.

Embodiment 11: In the positive electrode active material according to any one of Embodiments 7 to 10, a concentration ratio of element M1 to element M2 ranges from 1:50 to 50:1.

Embodiment 12: In the positive electrode active material according to any one of Embodiments 7 to 11, a ratio of element M1 to element B ranges from 0.3:1 to 3:1, further optionally from 0.4:1 to 2.5:1, and even further optionally from 0.5:1 to 2:1.

Embodiment 13: In the positive electrode active material according to any one of the foregoing embodiments, the active material bulk particle of the positive electrode active material contains element B.

Embodiment 14: In the positive electrode active material according to any one of the foregoing embodiments, concentration of element B ranges from 50 ppm to 5000 ppm.

Embodiment 15: In the positive electrode active material according to any one of the foregoing embodiments, the composite oxide has a molecular formula shown in formula (1):

$$Li_{1+a}[Ni_xCo_yMn_zB_bM1_cM2_d]O_2 \quad \text{formula (1),}$$

where $0.65<x<1$, $0<y<0.3$, $0<z<0.3$, $0<a<0.2$, $0<b<0.1$, $0<c<0.1$, $0<d<0.1$, and $x+y+z+b+c+d=1$.

Embodiment 16: A preparation method of positive electrode active material includes:

(1) mixing an active material precursor, a lithium-containing compound, a boron-containing compound, and an M1-containing compound, and performing sintering to obtain a positive electrode active material matrix, where element M1 is one or more of Zr, Ti, Te, Al, Ca, Si, Sb, Nb, Pb, V, Ge, Se, W, and Mo, and element M1 is doped inside the positive electrode active material matrix; the active material precursor contains element nickel, and a molar ratio of element nickel to element lithium in the lithium-containing compound ranges from 0.55 to 0.95; and (2) mixing the positive electrode active material matrix and an M2-containing compound, and performing sintering to obtain a positive electrode active material coated with an M2 oxide coating on the surface, where element M2 is one or more of Mg, Zn, Al, Ce, Ti, and Zr.

Embodiment 17: In the preparation method according to Embodiment 16, a sintering temperature in step (1) ranges from 700° C. to 1000° C., and optionally from 750° C. to 950° C.; and a sintering temperature in step (2) ranges from 180° C. to 700° C., and optionally from 200° C. to 650° C.

Embodiment 18: In the positive electrode active material according to Embodiment 16, concentration of element M1 ranges from 100 ppm to 6000 ppm, concentration of element M2 ranges from 50 ppm to 6000 ppm, and a concentration ratio of element M1 to element M2 ranges from 1:50 to 50:1.

Embodiment 19: In the preparation method according to any one of Embodiments 16 to 18, concentration of element B ranges from 50 ppm to 5000 ppm.

Embodiment 20: In the preparation method according to any one of Embodiment 16 to 19, a ratio of element M1 to element B ranges from 0.3:1 to 1.5:1, further optionally from 0.4:1 to 1.4:1, and even further optionally from 0.5:1 to 1.2:1.

Embodiment 21: The preparation method according to any one of Embodiments 16 to 20 further includes:

between step (1) and step (2), washing the positive electrode active material matrix in a solution, and performing drying.

Embodiment 22: In the preparation method according to any one of Embodiments 16 to 21, the active material precursor is a ternary active material precursor $[Ni_xCo_yMn_z](OH)_2$, where $0.65<x<1$, $0<y<0.3$, and $0<z<0.3$.

Embodiment 23: A positive electrode active material is prepared by using the method according to any one of Embodiments 16 to 22.

Embodiment 24: A positive electrode plate includes a current collector and a positive electrode active material layer disposed on at least one surface of the current collector, where the positive electrode active material layer includes the positive electrode active material according to any one of Embodiments 1 to 15 and Embodiment 23.

Embodiment 25: A lithium-ion secondary battery includes the positive electrode active material according to any one of Embodiments 1 to 15 and Embodiment 23, or the positive electrode plate according to Embodiment 24.

The following further describes beneficial effects of this application with reference to examples. Examples below more specifically describe the content of this application, which are only used for explanatory description. It is apparent for a person skilled in the art to make various modifications and variations within the scope of the content disclosed in this application.

Unless otherwise stated, all parts, percentages, and ratios described herein are based on weight. For example, concentration of an element is based on weight of the positive electrode active material. All agents used in the examples may be commercially available or synthesized by using the conventional methods, and may be directly used without further processing. Instruments used in the examples are all commercially available.

EXAMPLES

Preparation of a Button Cell

A positive electrode active material, PVDF, and conductive carbon were added to a specified amount of NMP in a ratio of 90:5:5. Stirring was performed in a drying room to obtain a slurry. The slurry was applied onto an aluminum foil, followed by drying and cold pressing, to obtain a positive electrode plate.

A lithium sheet was used as a negative electrode.

$LiPF_6$/(EC+DEC+DMC) with a volume ratio of 1:1:1 in 1 mol/L was used as an electrolyte.

In a button cell box, the positive electrode plate, a separator, and the negative electrode plate were stacked in sequence to obtain an electrode assembly, and the electrolyte was injected into the electrode assembly, to complete preparation of a button cell.

Test Method of the Initial Gram Capacity and First-Cycle Coulombic Efficiency of a Button Cell A button cell was charged to 4.25 V at 0.1 C under a voltage from 2.8 V to 4.25 V, charged at a constant voltage of 4.25 V to a current less than or equal to 0.05 mA, and then left for 2 min. A charging capacity was recorded as $C_0$. Then, the button cell was discharged at a constant current at 0.1 C to a voltage of 2.8 V, and in this case, a discharge capacity was an initial gram capacity and recorded as $D_0$. Therefore, the first-cycle coulombic efficiency was $D_0/C_0\times100\%$.

Preparation of a Full Cell

A nickel-rich positive electrode material modified with a gradient coated aluminum compound was used as a positive electrode active material, the positive electrode active material, a conductive agent acetylene black, and a binder polyvinylidene fluoride (PVDF) were fully stirred and mixed in an N-methylpyrrolidone solvent system in a weight ratio of 94:3:3, to obtain a positive electrode slurry. The positive electrode slurry was applied onto an aluminum foil, followed by drying and cold pressing, to obtain a positive electrode plate. A negative electrode active material artificial graphite, hard carbon, a conductive agent acetylene black, a binder styrene-butadiene rubber (SBR), a thickener sodium carboxymethyl cellulose (CMC) were uniformly stirred and mixed in a deionized water solvent system in a weight ratio of 90:5:2:2:1, to obtain a negative electrode slurry. The negative electrode slurry was applied onto a copper foil, followed by drying and cold pressing, to obtain a negative electrode plate. APE porous polymer film was used as a separator. The positive electrode plate, the separator, and the negative electrode plate were stacked in order, so that the separator was placed between positive and negative electrodes for isolation, and winding was performed to obtain a bare electrode assembly. The bare electrode assembly was placed into an outer package, and then a prepared electrolyte was injected, and then the outer package was sealed, to obtain a full cell.

Test Method of the Initial Gram Capacity of a Full Cell

In a constant-temperature environment of 25° C., a full cell was left standing for 5 min. The full cell was discharged at a constant current at a rate of 1/3 C to a voltage of 2.8 V, and then left for 5 min. The full cell was charged at a constant current at a rate of 1/3 C to a voltage of 4.25 V. The full cell was then charged at a constant voltage of 4.25 V to a current less than or equal to 0.05 mA, and then left for 5 min. In this case, a charging capacity is denoted as $C_0$ Then the full cell was discharged at a constant current at a rate of 1/3 C to a voltage of 2.8 V, then a discharge capacity is an initial gram capacity denoted as $D_0$. Therefore, the first-cycle coulombic efficiency was $D_0/C_0\times100\%$.

25° C./45° C. Cycling Performance Test of a Full Cell

In a constant-temperature of 25° C. or 45° C., at 2.8 V to 4.25 V, a full cell was charged at a constant current at a rate of 1 C to a voltage of 4.25 V, charged at a constant voltage of 4.25 V to a current less than 0.05 mA, left for 5 min, and then discharged at a constant current at a rate of 1 C to a voltage of 2.8 V. This was one charge and discharge cycle. The previous process was repeated. A capacity at the end of each cycle was denoted as $D_n$ (n=0, 1, 2 . . . ).

For 25° C., 1200 charge and discharge cycles were performed, and a discharge capacity of the 1200th cycle was recorded.

For 45° C., 800 charge and discharge cycles were performed, and a discharge capacity of the 800th cycle was recorded.

80° C. Swelling Test of a Full Cell

A full cell was left standing for 30 min at 25° C. in a constant-temperature environment, charged at a constant current at a rate of 1 C to a voltage of 4.25 V, and then charged at a constant voltage of 4.25 V to a current less than or equal to 0.05 mA. A volume of the full cell was tested (by a drainage method) and denoted as $V_0$. The full cell was stored in 100% SOC at 80° C. During the storage process, OCV, IMP, and volume of the electrode assembly were measured. Residual capacity and reversible capacity of the electrode assembly were tested at the end of storage. The full cell was baked every 48 h, and left standing for 1 h, followed by OCV and IMP test. After the full cell was cooled to room temperature, a volume of the electrode assembly was tested by the drainage method. The test was ended after storage for 10 days, and the volume V1 of the full cell was recorded. Protection voltage range: 2.7 V to 4.3 V; nominal capacity: 2.25 Ah.

$$\text{Volume swelling rate } \Delta V\,(\%) \text{ after storage at } 80°\text{ C. for 10 days} = (V1 - V0)/V0 \times 100\%$$

Counting of Lath-Shaped Primary Particles on the Surface of the Secondary Particle (1) An SEM measurement was performed on 4 or 5 secondary particle samples with an average particle size ranging from 6 μm to 20 μm. An outer surface of each secondary particle sample was photographed at a magnification of 50 k to obtain 50 k-times SEM images (for example, refer to FIG. 3 to FIG. 5).

(2) According to the obtained 50 k-times SEM images, the number of all primary particles in the outer layer of the secondary particle was calculated and denoted as a; the number of lath-shaped primary particles in the outer layer of the secondary particle was calculated and denoted as b; and a ratio of the number of lath-shaped primary particles to the number of all primary particles was calculated according to b/ax 100%. Alternatively, a measurement may be performed at other magnifications, for example, 10 k magnification or 30 k magnification (for example, refer to FIG. 6 to FIG. 7).

Counting of Lath-Shaped Primary Particles Inside the Secondary Particle (1) Secondary particle powder was made into an electrode plate which was then sliced. A slice was subjected to an SEM measurement. During measurement, a secondary particle with an average particle size of 6 μm to 20 μm were selected, where a cross section of the secondary particle exactly passes through the center of the secondary particle (which means the secondary particles was cut in half by the cross section). In order to ensure that the cross section of the selected particle cut the secondary particle in half, a diameter of the cross section of the selected particle was approximately equal to the diameter of the secondary particle. The cross section was photographed through SEM, where a shooting magnification was determined based on the fact that the entire cross section can be photographed (for example, refer to FIG. 8 to FIG. 9).

(2) According to the obtained SEM images of the complete cross section of the secondary particle, the number of cross sections of the primary particles are counted and denoted as c; and the number of lath-shaped particles with three typical quadrilateral cross sections is counted and denoted as d. A proportion of the primary particles with typical quadrilateral cross sections is d/c×100%.

Measurement of a Radial Orientation Degree of Primary Particles in the Secondary Particle In the foregoing SEM images of the complete cross section of the secondary particle, the number of primary particles with a length-width ratio greater than 2.0 was counted and denoted as e; the number of primary particles with a length-width ratio greater than 2.0 and an acute angle formed between a length direction of a primary particle and a diameter direction of a position of the primary particle less than 20 degrees was counted and denoted as f. The radial orientation degree of primary particles in the secondary particle was calculated as f/e×100%.

Figure 3:
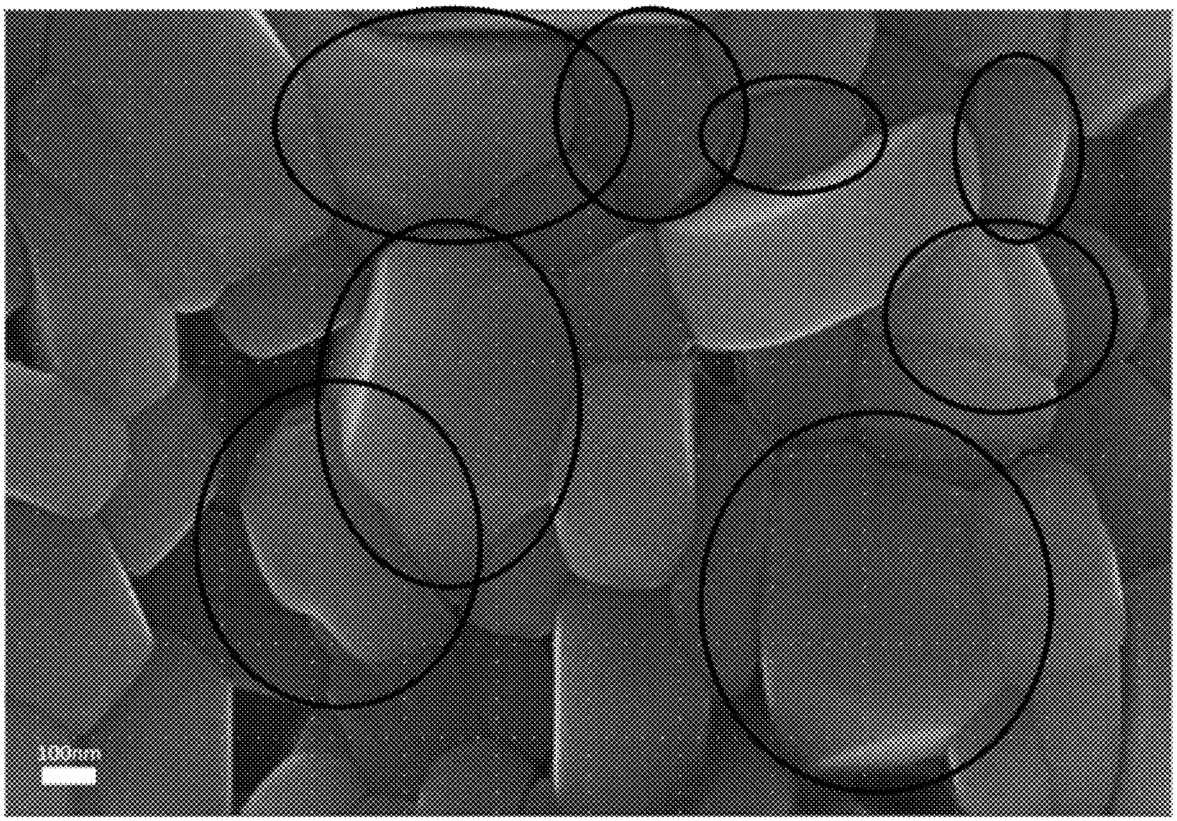
FIG. 3 is a 50 k-times SEM image of a synthetic sample in Comparative Example 2.
Figure 4:
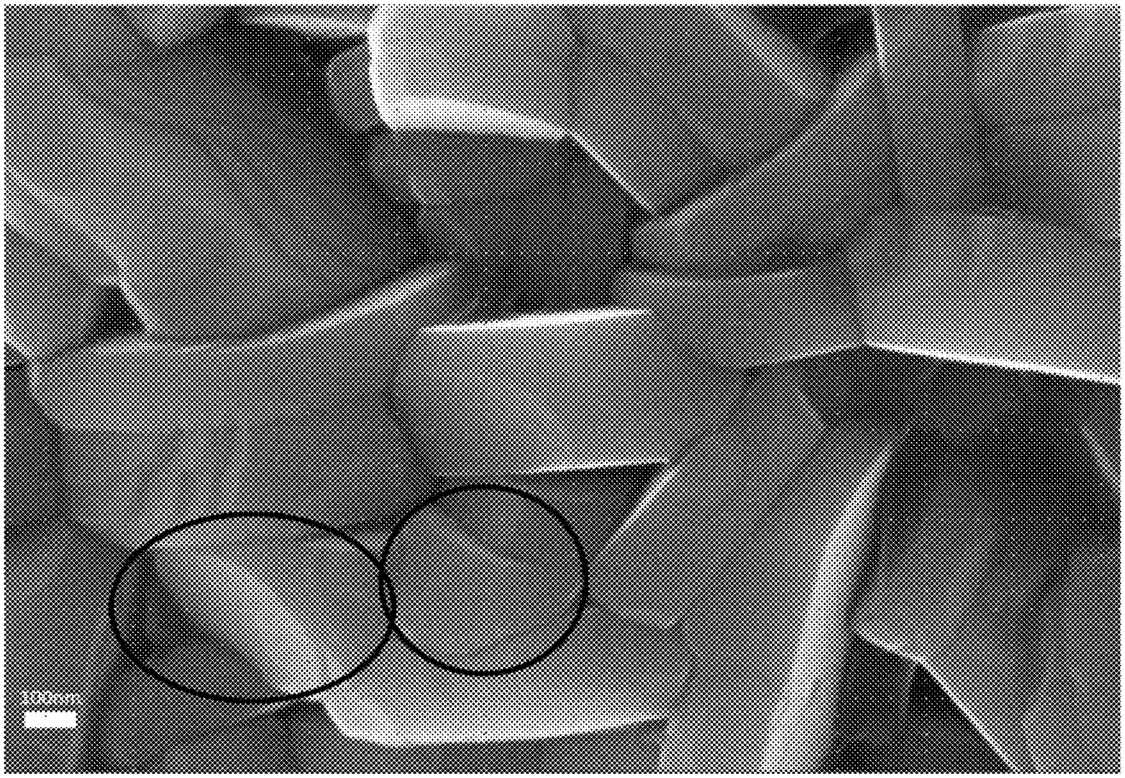
FIG. 4 is a 50 k-times SEM image of a synthetic sample in Example 1.

Uniformity measurement of element M1 in the secondary particle includes:

2 g of a positive electrode active material powder sample was taken, and uniformly spread on a sample stage with conductive adhesive, and then lightly pressed to fix the power. Alternatively, a 1 cm×1 cm electrode plate was cut out from a battery positive electrode plate, and pasted to the sample stage as a to-be-tested sample. The sample stage was mounted and fastened in a vacuum sample chamber, an IB-09010CP cross section polisher of Japan Electronics (JEOL) was used to prepare a cross section of a positive electrode active material particle, so that a cross section of the secondary particle was obtained, as shown in FIG. 3. As shown in FIG. 4, totally 17 sites of the particle cross section were taken, with each site having an area of 20 nm×20 nm. An X-Max energy spectrometer (EDS) of Oxford Instruments Group in the UK and a Sigma-02-33 model scanning electron microscope (SEM) of ZEISS in Germany were used to measure mass concentration of element M1 at the 17 sites. A test method was as follows: Elements Li, O, Ni, Co, Mn, and doping elements were selected for testing; SEM parameters were set as follows: 20 kV for acceleration voltage, 60 μm for aperture, 8.5 mm for working distance, and 2.335 A for current; the EDS test did not stop until an spectrum area reached 250,000 cts or above (which was controlled by a collection time and a collection rate); and data was collected to obtain the mass concentrations of element M1 at all sites, which were respectively denoted as η1, η2, η3, . . . , and η17.

A method for determining average mass concentration of element M1 in the secondary particle: The foregoing EDS-SEM test method was used to test all sites for point scanning of the secondary particle, where these sites are all within a cross section of a bulk particle, as shown by the dashed box in FIG. 4.

Then, uniformity of element M1 in the secondary particle was calculated according to the formula (1) described above.

Comparative Example 1

A nickel-rich active material precursor, lithium hydroxide, and titanium oxide were added to a high-speed mixer, where a molar ratio of the active material precursor to lithium hydroxide, Li/Me, was 1.05, and titanium oxide was added in an amount such that the proportion of added Ti was 2000 ppm by weight; and mixing was performed for 1 h, to obtain a pre-sintered mixture. The nickel-rich active material precursor was $[Ni_{0.8}Co_{0.1}Mn_{0.1}](OH)_2$. The prepared materials were put into an atmosphere sintering furnace to sinter at a sintering temperature of 830° C. in a sintering atmosphere of $O_2$ for a sintering time of 15 h to obtain a nickel-rich positive electrode matrix material.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. Main parameters are given in Table 1. See Table 2 for test results.

Comparative Example 2

Based on Comparative Example 1, a nickel-rich positive electrode matrix material was prepared by changing a pre-sintering temperature to 700° C., with other conditions unchanged.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

FIG. 3 is a 50 k-times SEM image of a synthetic sample in Comparative Example 2. Irregular lath-shaped primary particles are circled with black lines.

Figure 9:
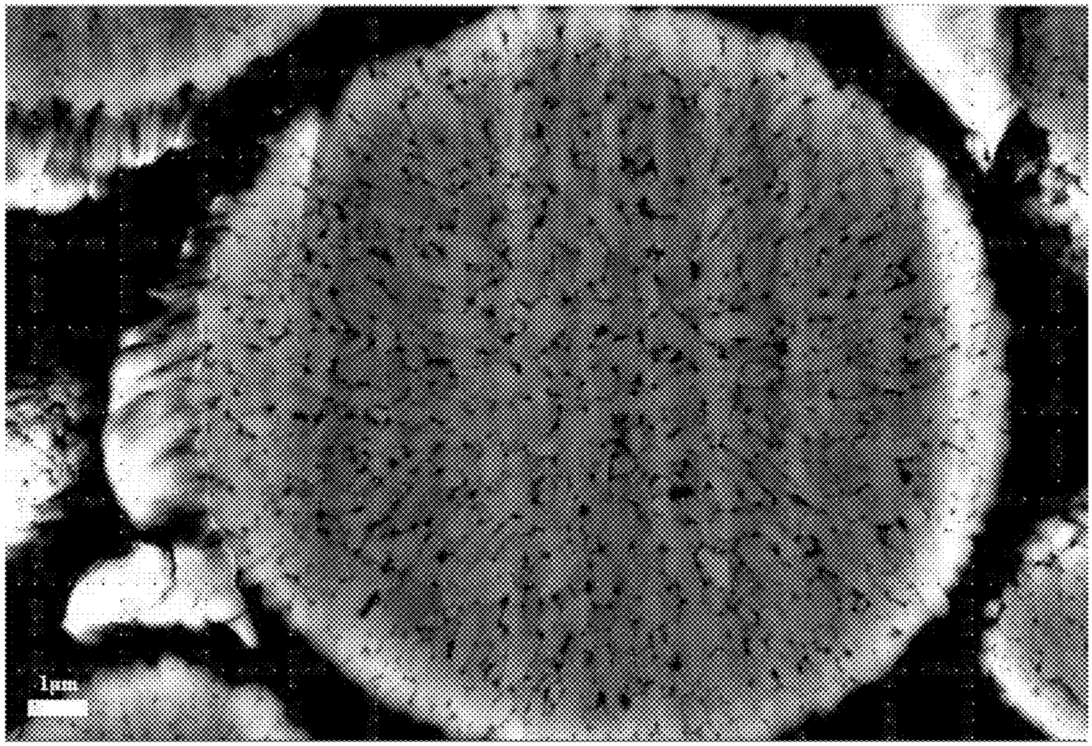
FIG. 9 is an image of a slice made from a synthetic sample in Comparative Example 2.

FIG. 9 is an SEM image of a slice of a positive electrode active material obtained in Comparative Example 2.

Comparative Example 3

Based on Comparative Example 1, a nickel-rich positive electrode matrix material was prepared by changing a pre-sintering temperature to 1000° C., with other conditions unchanged.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

Comparative Example 4

A nickel-rich active material precursor, lithium hydroxide, and titanium oxide were added to a high-speed mixer, where a molar ratio of the active material precursor to lithium hydroxide, Li/Me, was 1.05, and a weight ratio of the added titanium oxide was equal to concentration of added Ti, 2000 ppm; and mixing was performed for 1 h, to obtain a pre-sintered mixture, where the nickel-rich active material precursor was $[Ni_{0.8}Co_{0.1}Mn_{0.1}](OH)_2$. The prepared materials were put into an atmosphere sintering furnace to sinter at a sintering temperature of 830° C. in a sintering atmosphere of $O_2$ for a sintering time of 15 h to obtain a nickel-rich positive electrode matrix material.

$Al_2O_3$ with Al concentration of 2000 ppm and the nickel-rich positive electrode matrix material were mixed for 1 h by using a high-speed mixer, and then the mixture was placed into an $O_2$ atmosphere sintering furnace and sintered at 650° C. for 5 h, to obtain an aluminum-coated nickel-rich positive electrode material.

The nickel-rich positive electrode material prepared by using the foregoing processes was used to prepare a button cell. An initial discharge gram capacity of the button cell was tested at 0.1 C. The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

Example 1

A nickel-rich active material precursor, lithium hydroxide, titanium oxide, and boron oxide were added to a high-speed mixer, where a molar ratio of the active material precursor to lithium hydroxide, Li/Me, was 1.05, titanium oxide was added in an amount such that the proportion of Ti was 2000 ppm by weight, and boron oxide was added in an amount such that the proportion of B was 1500 ppm by weight; and mixing was performed for 1 h, to obtain a pre-sintered mixture. The nickel-rich active material precursor was $[Ni_{0.8}Co_{0.1}Mn_{0.1}](OH)_2$. The prepared materials were put into an atmosphere sintering furnace to sinter at a sintering temperature of 830° C. in a sintering atmosphere of $O_2$ for a sintering time of 15 h to obtain a nickel-rich positive electrode matrix material having bulk doped and typical lath-shaped primary particles.

$Al_2O_3$ with Al concentration of 100 ppm and the nickel-rich positive electrode matrix material were mixed for 2 h by using a high-speed mixer, and then the mixture was placed into an $O_2$ atmosphere sintering furnace and sintered at 250° C. for 5 h, to obtain a nickel-rich positive electrode material product.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

FIG. 4 is a 50 k-times SEM image of a synthetic sample in Example 1. Irregular lath-shaped primary particles are circled with black lines.

Figure 10:
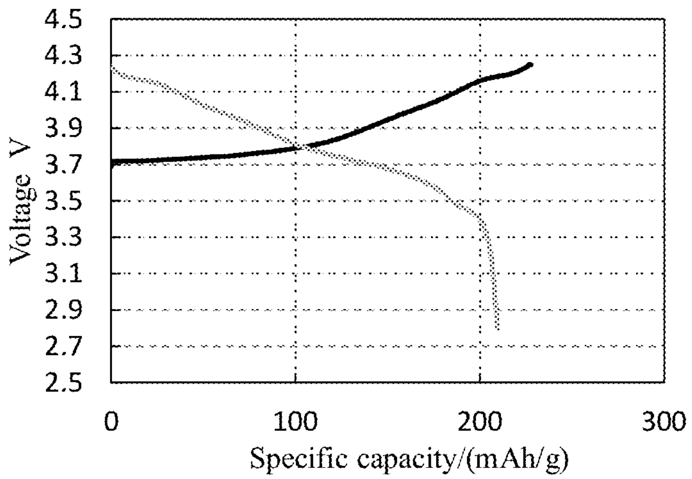
FIG. 10 shows first charge and discharge curves of a button cell made of a nickel-rich positive electrode material prepared in Example 1.

FIG. 10 shows first charge and discharge curves of a button cell made of a nickel-rich positive electrode material prepared in Example 1.

Figure 11:
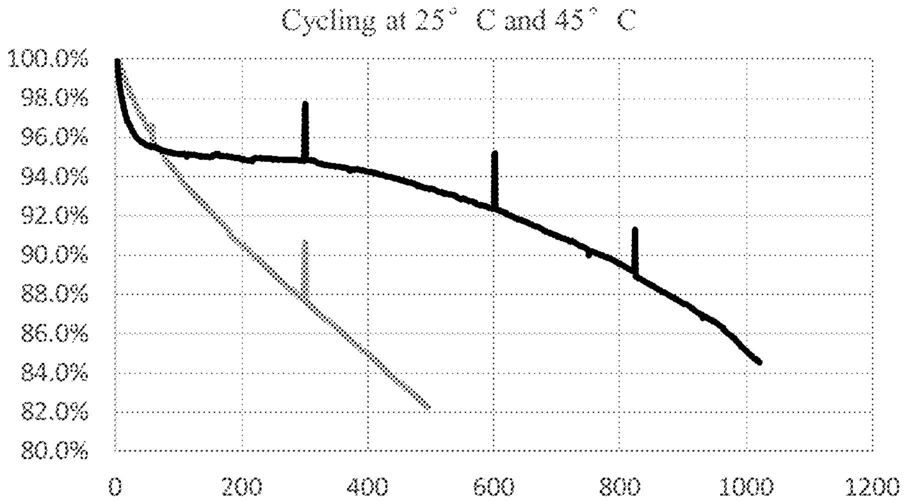
FIG. 11 shows 45° C. cycling comparison curves of a full cell made of a nickel-rich positive electrode material prepared in Comparative Example 1 and Example 1.
Figure 12:
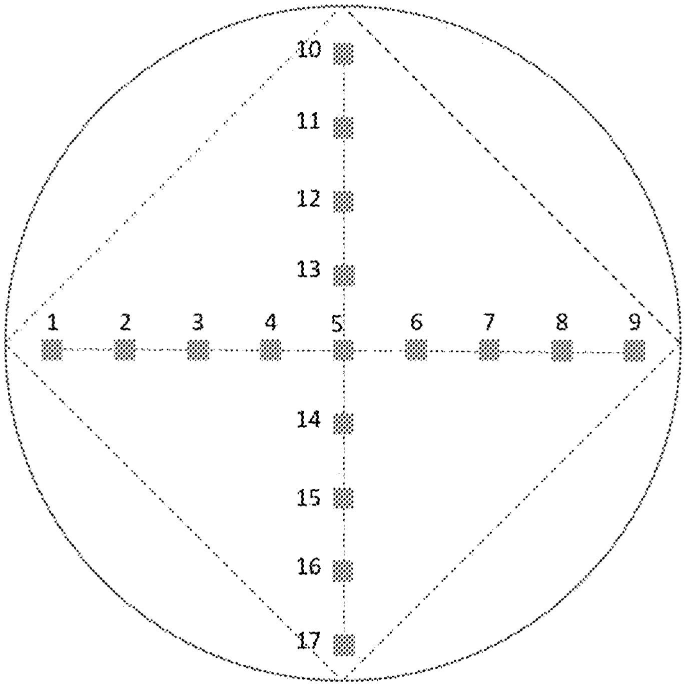
FIG. 12 is a schematic diagram of measuring points in a uniformity test.

FIG. 11 shows 45° C. cycling comparison curves of a full cell made of a nickel-rich positive electrode material prepared in Comparative Example 1 and Example 1. The horizontal coordinate represents the number of cycles, and the vertical coordinate represents the gram capacity retention rate. The black line represents a cycling curve in Example 1, and the light gray line represents a cycling curve in Comparative Example 1.

Example 2

A nickel-rich active material precursor, lithium hydroxide, zirconium oxide, and boric acid were added to a high-speed mixer, where a molar ratio of the active material precursor to lithium hydroxide, Li/Me, was 1.05, zirconium oxide was added in an amount such that the proportion of Zr was 4000 ppm by weight, and boric acid was added in an amount such that the proportion of B was 100 ppm by weight; and mixing was performed for 2 h, to obtain a pre-sintered mixture. The nickel-rich active material precursor was $[Ni_{0.7}Co_{0.15}Mn_{0.15}](OH)_2$. The prepared materials were put into an atmosphere sintering furnace to sinter at a sintering temperature of 950° C. in a sintering atmosphere of $O_2$ for a sintering time of 20 h, to obtain a nickel-rich positive electrode matrix material having bulk doped and typical lath-shaped primary particles.

A specified amount of deionized water solution was added to a washing kettle, and then the nickel-rich positive electrode matrix material was added in a solid-liquid ratio of 1:0.5, where a washing temperature was 40° C., a stirring speed was 100 rpm, and a washing time was 60 min; and then centrifuging was performed with a centrifuge. The centrifuged material was dried in a vacuum drying oven at 120° C. for 5 h, to obtain a washed nickel-rich positive electrode material.

MgO with Mg concentration of 3000 ppm and the nickel-rich positive electrode matrix material that had been washed and dried were mixed for 2 h by using a high-speed mixer, and then the mixture was placed into an $O_2$ atmosphere sintering furnace and sintered at 500° C. for 5 h, to obtain a nickel-rich positive electrode material product.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

Example 3

A nickel-rich active material precursor, lithium hydroxide, calcium oxide, and $C_6H_5B(OH)_2$ were added to a high-speed mixer, where a molar ratio of the active material precursor to lithium hydroxide, Li/Me, was 1.05, calcium oxide was added in an amount such that the proportion of Ca was 400 ppm by weight, and $C_6H_5B(OH)_2$ was added in an amount such that the proportion of B was 1000 ppm by weight; and mixing was performed for 0.5 h, to obtain a pre-sintered mixture, where the nickel-rich active material precursor was $[Ni_{0.85}C_{0.10}Mn_{0.05}](OH)_2$. The prepared materials were put into an atmosphere sintering furnace to sinter at a sintering temperature of 750° C. in a sintering atmosphere of $O_2$ for a sintering time of 20 h, to obtain a nickel-rich positive electrode matrix material having bulk doped and typical lath-shaped primary particles.

A mixture solution of ethanol and water in a ratio of 1:1 was prepared, and then the nickel-rich positive electrode matrix material was added in a solid-liquid ratio of 1:3, where a washing temperature was 30° C., a stirring speed was 20 rpm, and a washing time was 1 min, and then centrifuging was performed with a centrifuge. The centrifuged material was dried in a vacuum drying oven at 90° C. for 10 h to obtain a washed nickel-rich positive electrode material.

MgO with Mg concentration of 4000 ppm and the nickel-rich positive electrode matrix material that had been washed and dried were mixed for 0.5 h by using a high-speed mixer, and then the mixture was placed into an $O_2$ atmosphere sintering furnace and sintered at 200° C. for 5 h, to obtain a nickel-rich positive electrode material product.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

Figure 6:
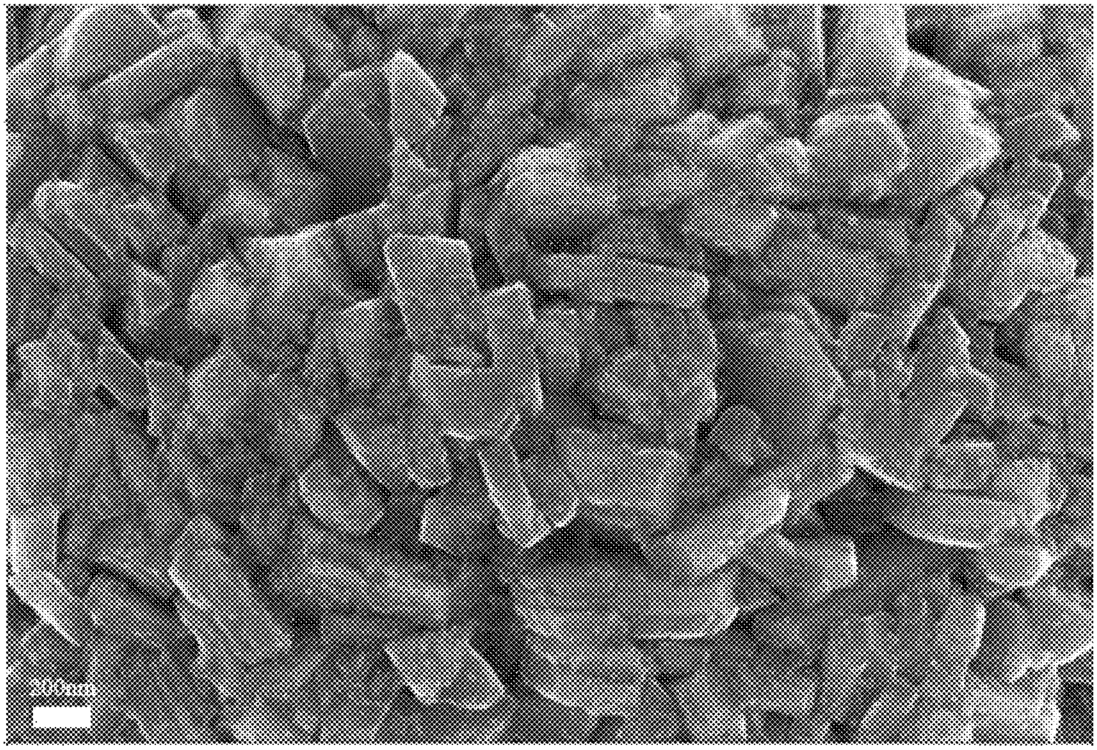
FIG. 6 is a 30 k-times SEM image of a synthetic sample in Example 3.

FIG. 6 is a 30 k-times SEM image of a synthetic sample in Example 3.

Figure 8:
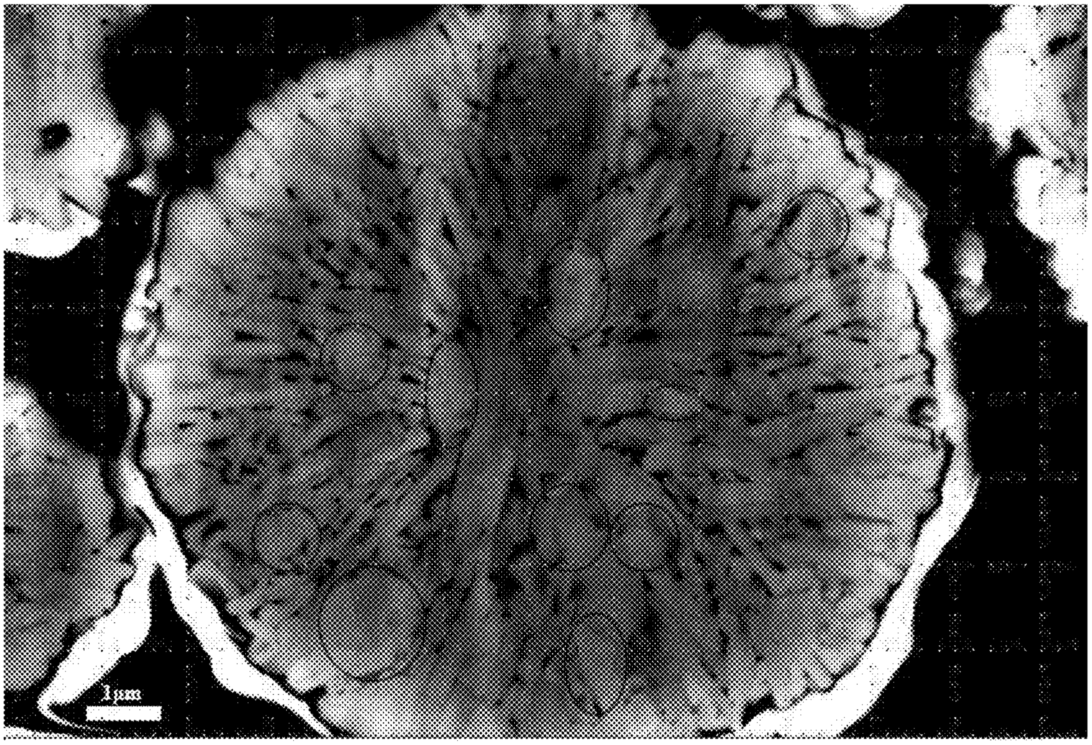
FIG. 8 is an image of a slice made from a synthetic sample in Example 3.

FIG. 8 is an image of a slice made from the synthetic sample in Example 3, where irregular lath-shaped primary particles are circled with black lines.

Example 4

A nickel-rich active material precursor, lithium hydroxide, zirconium oxide, boron oxide, and boric acid were added to a high-speed mixer, where a molar ratio of the active material precursor to lithium hydroxide, Li/Me, was 1.05, zirconium oxide was added in an amount such that the proportion of Zr was 1000 ppm by weight, and boron oxide and boric acid were added in an amount such that the proportion of B was 2000 ppm by weight; and mixing was performed for 0.5 h, to obtain a pre-sintered mixture. The nickel-rich active material precursor was $[Ni_{0.85}Co_{0.10}Mn_{0.05}](OH)_2$. The prepared materials were put into an atmosphere sintering furnace to sinter at a sintering temperature of 800° C. in a sintering atmosphere of $O_2$ for a sintering time of 10 h, to obtain a nickel-rich positive electrode matrix material having bulk doped and typical lath-shaped primary particles.

$AlCl_3$ with Al concentration of 1000 ppm and the nickel-rich positive electrode matrix material were mixed for 1 h by using a high-speed mixer, and then the mixture was placed into an $O_2$ atmosphere sintering furnace and sintered at 200° C. for 3 h, to obtain a nickel-rich positive electrode material product.

The nickel-rich positive electrode material prepared by using the foregoing processes was used to prepare a button cell. An initial discharge gram capacity of the button cell was tested at 0.1 C.

The nickel-rich positive electrode material was used to prepare a full cell. A full cell capacity was tested at 1/3 C, 25° C. cycling was tested at 1 C/1 C at 25° C., 45° C. cycling was tested at 1 C/1 C at 45° C., and a swelling trend of the full cell was tested after storage at 80° C. for 10 days. See Table 2 for test results.

Figure 7:
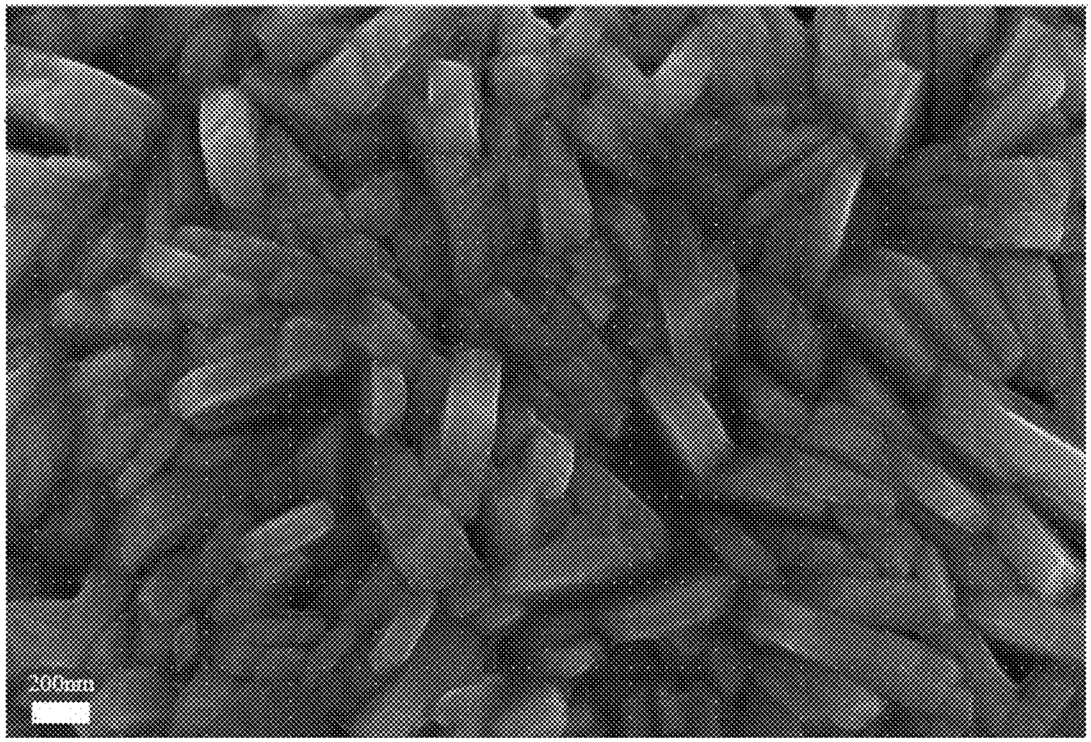
FIG. 7 is a 30 k-times SEM image of a synthetic sample in Example 4.

FIG. 7 is a 30 k-times SEM image of a synthetic sample in Example 4.

Examples 5 to 14

Examples 5 to 14 are performed by a method similar to that in Example 3. Main parameters are given in Table 1. See Table 2 for test results.

Figure 5:
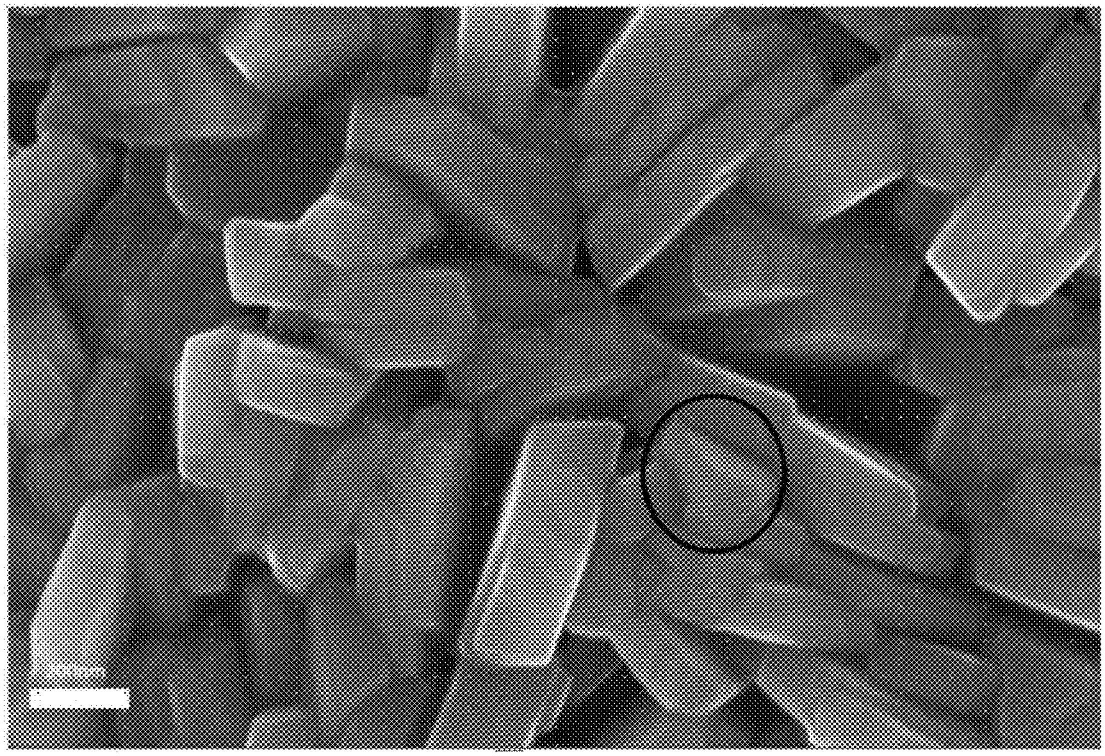
FIG. 5 is a 50 k-times SEM image of a synthetic sample in Example 10.

FIG. 5 is a 50 k-times SEM image of a synthetic sample in Example 10. Irregular lath-shaped primary particles are circled with black lines.

TABLE 1

Main parameters in Examples 1 to 14 and Comparative Examples 1 to 4

| Example | Content of nickel in matrix | Proportion of lath-shaped primary particles on surface of secondary particle | Proportion of lath-shaped primary particles inside secondary particle | Radial orientation degree of primary particles in secondary particle | Coating layer thickness/μm | Length-width ratio | BET | D50 |
|---|---|---|---|---|---|---|---|---|
| Comparative Example 1 | Ni80 | 46% | 28% | 32% | 0 | 1.5:1 | 0.21 | 10.2 |
| Comparative Example 2 | Ni80 | 42% | 32% | 43% | 0 | 2.3:1 | 0.43 | 10.3 |
| Comparative Example 3 | Ni80 | 38% | 25% | 36% | 0 | 1.2:1 | 0.19 | 10 |
| Comparative Example 4 | Ni80 | 63% | 50% | 48% | 0.10 | 2.5:1 | 0.35 | 10.5 |
| Example 1 | Ni80 | 83% | 72% | 82% | 0.08 | 4.2:1 | 0.39 | 10.7 |
| Example 2 | Ni80 | 81% | 70% | 80% | 0.11 | 7.2:1 | 0.42 | 10.2 |
| Example 3 | Ni80 | 90% | 84% | 90% | 0.14 | 5.8:1 | 0.52 | 10.6 |
| Example 4 | Ni80 | 91% | 85% | 92% | 0.12 | 9.2:1 | 0.43 | 6.2 |
| Example 5 | Ni80 | 90% | 84% | 88% | 0.15 | 4.5:1 | 0.47 | 7.3 |
| Example 6 | Ni80 | 88% | 81% | 82% | 0.07 | 5.0:1 | 0.58 | 9.6 |
| Example 7 | Ni80 | 86% | 78% | 81% | 0.09 | 5.7:1 | 0.53 | 8.4 |
| Example 8 | Ni80 | 87% | 79% | 83% | 0.06 | 5.9:1 | 0.65 | 10.8 |
| Example 9 | Ni80 | 88% | 77% | 82% | 0.08 | 6.8:1 | 0.72 | 12.6 |
| Example 10 | Ni80 | 92% | 85% | 88% | 0.15 | 8.7:1 | 0.87 | 19.5 |
| Example 11 | Ni88 | 87% | 79% | 84% | 0.07 | 6.1:1 | 0.73 | 14.6 |
| Example 12 | Ni80 | 89% | 83% | 89% | 0.11 | 8.9:1 | 0.48 | 6.1 |
| Example 13 | Ni80 | 87% | 82% | 85% | 0.09 | 9.0:1 | 0.52 | 6.3 |
| Example 14 | Ni80 | 80% | 70% | 80% | 0.15 | 7.3:1 | 0.41 | 6.2 |

| | M1 | | | | M2 | | | | B | | |
|---|---|---|---|---|---|---|---|---|---|---|---|
| Example | Source | Type | Concentration | Uniformity % | Source | Type | Concentration | M1:M2 | Source | Concentration | M1:B |
| Comparative Example 1 | Titanium oxide | Ti | 2000 | 8 | \ | \ | \ | \ | \ | \ | \ |
| Comparative Example 2 | Titanium oxide | Ti | 2000 | 6 | \ | \ | \ | \ | \ | \ | \ |
| Comparative Example 3 | Titanium oxide | Ti | 2000 | 13 | \ | \ | \ | \ | \ | \ | \ |
| Comparative Example 4 | Titanium oxide | Ti | 2000 | 12 | Aluminum oxide | Al | 2000 | 1:1 | \ | \ | \ |
| Example 1 | Titanium oxide | Ti | 2000 | 9 | Aluminum oxide | Al | 100 | 20:1 | Boron oxide | 1500 | 1.33:1 |
| Example 2 | Zirconium oxide | Zr | 4000 | 11 | Magnesium oxide | Mg | 3000 | 1.75:1 | Boric acid | 100 | 40:1 |
| Example 3 | Calcium oxide | Ca | 1000 | 5 | Magnesium oxide | Mg | 2000 | 0.5:1 | Benzeneboronic acid | 1000 | 1:1 |
| Example 4 | Zirconium oxide | Zr | 1000 | 12 | Aluminum chloride | Al | 1000 | 1:1 | Boric acid | 2000 | 0.5:1 |
| Example 5 | Antimony oxide | Sb | 2000 | 7 | Titanium oxide | Ti | 2000 | 1:1 | Boron oxide | 2500 | 0.8:1 |
| Example 6 | Titanium oxide | Ti | 2000 | 10 | Zirconium oxide | Zr | 1500 | 1.33:1 | Boric acid | 500 | 4:1 |
| Example 7 | Tungsten oxide | W | 2000 | 13 | Aluminum oxide | Al | 2000 | 1:1 | Boric acid | 300 | 6.7:1 |
| Example 8 | Titanium oxide | Ti | 2000 | 16 | Aluminum oxide | Al | 1500 | 1.33:1 | Benzeneboronic acid | 1000 | 2:1 |
| Example 9 | Titanium oxide | Ti | 2000 | 17 | Aluminum oxide | Al | 4000 | 0.5:1 | Boric acid | 1000 | 2:1 |
| Example 10 | Antimony oxide | Sb | 2000 | 20 | Aluminum oxide | Al | 3500 | 1:1.75 | Boron oxide | 1600 | 1.25:1 |
| Example 11 | Titanium oxide | Ti | 2500 | 8 | Magnesium oxide | Mg | 1000 | 2.5:1 | Boron oxide | 1500 | 1.67:1 |
| Example 12 | Zirconium oxide | Zr | 1000 | 12 | Aluminum chloride | Al | 1000 | 1:1 | Boric acid | 1500 | 1:1.5 |
| Example 13 | Zirconium oxide | Zr | 1000 | 12 | Aluminum chloride | Al | 1000 | 1:1 | Boric acid | 1000 | 1:1 |
| Example 14 | Zirconium oxide | Zr | 1000 | 12 | Aluminum chloride | Al | 1000 | 1:1 | Boric acid | 4000 | 1:4 |

Note:
"/" means no such substances are added.

TABLE 2

Test results of Examples 1 to 14 and Comparative Examples 1 to 4

| Examples | Button cell capacity at 0.1 C (mAh/g) | Full cell capacity at 1/3 C (mAh/g) | 1200 cycles at 25° C. (%) | 800 cycles at 45° C. (%) | Swelling rate at 80° C. @10 days (%) |
|---|---|---|---|---|---|
| Comparative Example 1 | 195.7 | 187.8 | 82.5 | 65.8 | 75.1 |
| Comparative Example 2 | 188.5 | 181.3 | 73.2 | 57.2 | 88.8 |
| Comparative Example 3 | 190.2 | 182.8 | 75.3 | 60.4 | 82.5 |
| Comparative Example 4 | 202.1 | 196.5 | 86.5 | 77.3 | 42.4 |
| Example 1 | 205.3 | 200.1 | 91.8 | 89.6 | 26.1 |
| Example 2 | 203.5 | 199.2 | 90.5 | 88.8 | 23.9 |
| Example 3 | 210.5 | 203.3 | 91.1 | 90.2 | 24.4 |
| Example 4 | 209.2 | 202.6 | 91.0 | 89.8 | 21.4 |
| Example 5 | 208.9 | 201.6 | 91.7 | 89.9 | 22.5 |
| Example 6 | 206.4 | 200.1 | 90.3 | 88.2 | 23.8 |
| Example 7 | 204.0 | 199.7 | 89.2 | 87.7 | 25.5 |
| Example 8 | 207.8 | 201.2 | 90.7 | 88.6 | 24.5 |
| Example 9 | 205.1 | 199.6 | 90.5 | 88.5 | 26.1 |
| Example 10 | 204.4 | 199.2 | 91.8 | 89.9 | 21.9 |
| Example 11 | 214.6 | 207.5 | 90.2 | 87.5 | 26.5 |
| Example 12 | 209.0 | 202.1 | 90.3 | 89.4 | 24.4 |
| Example 13 | 209.9 | 202.9 | 90.1 | 89.0 | 27.1 |
| Example 14 | 207.4 | 201.5 | 89.7 | 88.0 | 21.2 |

In addition, in those cases where it can be seen from Comparative Examples 1 to 3 that when the material was doped with no element B, the proportion of lath-shaped primary particles was relatively low, and the length-width ratio was relatively small. In addition, when the temperature was too high or too low, the proportion of lath-shaped primary particles was also reduced, with the capacity and cycle performance deteriorated.

According to the comparison between Comparative Example 4 and Comparative Examples 1 to 3, when the surface was coated with the M2 coating layer, the side reactions between the surface of the material and the electrolyte were reduced, thereby improving the cycling performance and the swelling resistance performance.

According to the comparison between Examples 1 to 14 and Comparative Example 4, when the material was doped with elements M1 and B, most of the primary particles become lath-shaped particles. The lath-shaped particles accounted for more than 80%, and even as high as 92%. Regular lath-shaped primary particles accounted for more than 70%, with a length-width ratio significantly increased. Compared with a sample of Comparative Example 2 (FIG. 9), in a sample of Example 3 (FIG. 8), the primary particles were arranged radially from the center of the secondary particles to the periphery clearly.

Compared with the comparative examples, samples of Examples 1 to 14 all obtained significantly higher ratio of lath-shaped particles and ratio of regular lath-shaped primary particles, and obvious radial arrangement; capacities of the button cell and the full cell were significantly increased, and the cycling performance and swelling resistance performance were significantly improved. Without theoretical constraints, it can be considered that by doping elements M1 and B and forming the M2 coating layer, the layered structure of the primary particles themselves can be significantly improved, the stability and high/low-temperature cycling performance of the material can also be improved, and the energy density can be maintained or even further increased.

According to comparison between Example 4 and Examples 12 and 13, for the same Ni80 material, although M1 and its doping amount, M2 and its coating amount were the same, as the doping amount of element B decreased, the proportion of the lath-shaped primary particles in the secondary particle decreased, and the radial orientation degree of the primary particles decreased, resulting in a slight decrease in cycling performance; moreover, due to a decrease of the doping amount of B, the swelling resistance performance of the material was deteriorated. According to comparison between Example 4 and Examples 12, 13, and 14, M1 and its doping amount, M2 and its coating amount were the same, but the doping amount of element B was too high, so that the proportion of lath-shaped primary particles was reduced, and the cycling performance and swelling resistance performance were deteriorated. Therefore, the doping amount of B, a ratio of M1 to B, and a ratio of M2 to B should not be too high or too low. The inventor also has found that the ratio of M1 to B and the ratio of M2 to B should be between 0.5:1 and 2:1, so that the primary particles are typically lath-shaped and are well distributed radially, and good cycling performance, good swelling resistance performance, and high capacity are achieved.

It can be seen from Examples 5 to 14 that as the doping uniformity of M1 decreased, the structural stability of the material gradually decreased, and the cycling performance decreased slightly.

According to comparison between Example 1 and Examples 2 and 3, the swelling resistance performance could be further improved by performing the additional washing step.

The investor also has found that the doping amount of M1 and the coating amount of M2 have a great impact on battery performance. The battery performance can be further improved by selecting appropriate doping amount of M1 and coating amount of M2. The doping amount of M1 should not be too high, and the coating amount of M2 should not be too high. For example, in Example 2 and Examples 9 and 10, high doping amount of M1 and high coating amount of M2 were used, respectively, compromising the battery capacity to some degree. In Examples 3, 4 and 5, the appropriate doping amount of M1 and coating amount of M2 were used, and a higher capacity was obtained while maintaining the cycling performance and stability.

In addition, by increasing the concentration of nickel in the matrix, the battery capacity can be greatly increased, but the cycling performance and swelling resistance performance may be damaged to some degree. For example, in Example 11, a percentage of Ni in the matrix was 88%, which significantly increased the battery capacity, but the cycling performance and swelling resistance performance of the battery were also reduced. Therefore, a balance between the capacity, the cycling performance, and the swelling resistance performance can be achieved by selecting appropriate combinations of parameters from various parameters.

A person skilled in the art will understand that for the disclosed processes and/or methods, functions performed in the processes and methods may be implemented in different orders. In addition, the described steps and operations are provided as examples only, and some steps and operations may be optional, may be combined into fewer steps and operations, or may be expanded to other steps and operations, without departing from the essence of the disclosed embodiments.

Conventions similar to "at least one of A, B, and C, and the like" are used, such structures usually have the meaning of conventions understood by a person skilled in the art (for example, "a system having at least one of A, B and C" shall include but is not limited to a system having A alone, a system having B alone, a system having C alone, a system having both A and B, a system having both A and C, a system having both B and C, and/or a system having A, B and C and the like). In those cases where conventions similar to "at least one of A, B, or C, or the like." are used, such structures have the meaning of conventions that will be understood by a person skilled in the art (for example, "a system having at least one of A, B, or C" shall include, but is not limited to, having A alone, having B alone, having C alone, having both A and B, having both A and C, having both B and C, and/or having A, B and C). A person skilled in the art will further understand that, in practical, whether in the specification, claims, or accompany drawings, any disjunctive words and/or phrases that present two or more alternative terms should be considered to include one of these terms, and the possibility of one or both of these terms. For example, the phrase "A or B" will be understood to include the possibilities of "A" or "B" or "A and B."

In addition, in case where features or aspects of the present disclosure are described in terms of the Markush group, a person skilled in the art will learn that the present disclosure is therefore also described in terms of any single member or subset of members of the Markush group.

As a person skilled in the art will understand, for any and all purposes, such as in terms of providing written instructions, all ranges disclosed herein also cover any and all possible subranges and combinations of the subranges. Any listed range can be easily recognized as a full description, and the same range can be evenly decomposed into at least half, one-third, one-quarter, one-fifth, one-tenth, and the like. As non-limiting examples, the various ranges discussed herein can be easily decomposed into the lower one third, the middle one third, the upper one third, and the like. As a person skilled in the art will also understand, all languages, such as "at most", "at least" include the recited numbers and refer to ranges, which can then be subdivided into the foregoing subranges. Finally, as a person skilled in the art will understand, the scope includes each individual member. Thus, for example, a group having 1 to 3 units refers to a group having 1, 2, or 3 units. Similarly, a group having 1 to 5 units refers to a group having 1, 2, 3, 4, or 5 units, and so on.

Regarding basically any plural and/or singular terms used herein, a person skilled in the art can appropriately convert from the plural to the singular and/or from the singular to the plural according to the context and/or applications. For clarity, various singular/plural transformation can be explicitly elaborated herein.

For simplicity, only some numerical ranges are explicitly disclosed herein. However, any lower limit can be combined with any upper limit to form an unspecified range; any lower limit can be combined with other lower limits to form an unspecified range, and similarly, and any upper limit can be combined with any other upper limit to form an unspecified range. In addition, although not explicitly stated, every site or single value between end sites of a range is included in the range. Therefore, each site or single numerical value can be used as its own lower limit or upper limit in combination with any other site or single numerical value or in combination with other lower or upper limits to form an unspecified range. The ranges obtained by these combinations are all understood as the content actually disclosed herein.

According to the disclosure and teaching of this specification, a person skilled in the art of this application may further make appropriate changes or modifications to the foregoing embodiments. Therefore, this application is not limited to the foregoing disclosure and the described embodiments, and some changes or modifications to this application shall also fall within the protection scope of the claims of this application. In addition, although some specific terms are used in this specification, these terms are used only for ease of description, and do not constitute any limitation on this application.

What is claimed is:

1. A positive electrode active material, comprising a composite oxide of lithium, boron, and a transition metal element, wherein the transition metal element comprises element nickel, and a molar ratio of element nickel to element lithium ranges from 0.55 to 0.95;

the positive electrode active material comprises secondary particles formed by primary particles; at least 50% of the primary particles in the secondary particle are arranged radially from the center of the secondary particle to a periphery thereof; in an outer layer of the secondary particle, 70% or more of the primary particles each have at least two parallel sides; and in a cross section along the center of the secondary particle, 60% or more of the primary particles each have at least two parallel sides, the positive electrode active material comprises active material bulk particles doped with an element M1 and a coating layer covering an outer surface of each active material bulk particle; the coating layer comprises an element M2; the element M1 is one or more of Zr, Ti, Te, Ca, Si, Sb, Nb, Pb, V, Ge, Se, W, and Mo; and the element M2 is one or more of Mg, Zn, Al, Ce, and Ti; and a concentration ratio of the element M1 to element B ranges from 0.3:1 to 2.5:1, a concentration ratio of element M2 to element B range ranges from 0.5:1 to 2:1, an average length-width ratio of the primary particles ranges from 2:1 to 15:1, a concentration of element B ranges from 100 ppm to 4500 ppm, a concentration of element M1 ranges from 100 ppm to 6000 ppm, and a concentration of element M2 ranges from 1000 ppm to 6000 ppm.

2. The positive electrode active material according to claim 1, wherein an average value of an acute angle formed between a length direction of the primary particle and a diameter direction of a position of the primary particle is less than 20 degrees, optionally less than 15 degrees, and further optionally less than 10 degrees.

3. The positive electrode active material according to claim 1, wherein an average length of the primary particles ranges from 100 nm to 2000 nm.

4. The positive electrode active material according to claim 1, wherein a specific surface area of the positive electrode active material ranges from 0.2 $m^2/g$ to 1.2 $m^2/g$, and optionally from 0.3 $m^2/g$ to 1.0 $m^2/g$; and/or, D50 of the secondary particles ranges from 6 μm to 20 μm.

5. The positive electrode active material according to claim 1, wherein the composite oxide has a molecular formula shown in formula (1):

$$Li_{1+a}[Ni_xCo_yMn_zB_bM1_cM2_d]O_2 \quad \text{formula (1)}$$

wherein $0.65<x<1$, $0<y<0.3$, $0<z<0.3$, $0<a<0.2$, $0<b<0.1$, $0<c<0.1$, $0<d<0.1$, and $x+y+z+b+c+d=1$.

6. A positive electrode plate, comprising a current collector and a positive electrode active material layer disposed on at least one surface of the current collector, wherein the positive electrode active material layer comprises the positive electrode active material according to claim 1.

7. A lithium-ion secondary battery, comprising the positive electrode active material according to claim 1.

8. A battery module, comprising the positive electrode active material according to claim 1.

9. A battery pack, comprising the battery module according to claim 8.

10. An apparatus, comprising the lithium-ion secondary battery according to claim 7.

11. The positive electrode active material according to claim 1, wherein M1 is one or more of Te, Si, Nb, Pb, V, Ge, Se, and Mo.

12. The positive electrode active material according to claim 1, wherein M1 is one or more of Ti, Zr, Ca, Sb, and W.

13. The positive electrode active material according to claim 12, wherein M1 is one or more of Ca, Sb, and W.

14. The positive electrode active material according to claim 1, wherein M2 is one or more of Al, Mg, and Ti.

15. The positive electrode active material according to claim 1, wherein M2 is one or more of Zn and Ce.

16. The positive electrode active material according to claim 1, wherein the concentration of element B ranges from 1000 ppm to 2000 ppm, the concentration of M1 ranges from 1000 ppm to 2000 ppm, the concentration of element M2 ranges from 1000 ppm to 2000 ppm.

17. The positive electrode active material according to claim 1, wherein a thickness of the coating layer ranges from 0.001 μm to 0.2 μm.

18. The positive electrode active material according to claim 16, wherein a thickness of the coating layer ranges from 0.01 μm to 0.15 μm.

19. A preparation method of a positive electrode active material, comprising:

(1) mixing an active material precursor, a lithium-containing compound, a boron-containing compound, and an M1-containing compound, and performing sintering to obtain a positive electrode active material matrix, wherein element M1 is one or more of Zr, Ti, Te, Ca, Si, Sb, Nb, Pb, V, Ge, Se, W, and Mo, and element M1 is doped inside the positive electrode active material matrix; the active material precursor contains element nickel, and a molar ratio of element nickel to element lithium in the lithium-containing compound ranges from 0.55 to 0.95; and (2) mixing the positive electrode active material matrix and an M2-containing compound, and performing sintering to obtain a positive electrode active material coated with an M2 oxide coating on a surface thereof, where element M2 is one or more of Mg, Zn, Al, Ce, and Ti, and Zr; and the positive electrode active material comprises active material bulk particles doped with the element M1 and a coating layer covering an outer surface of each active material bulk particle; the coating layer comprises the element M2; and a concentration ratio of the element M1 to element B ranges from 0.3:1 to 2.5:1, a concentration ratio of element M2 to element B ranges from 0.5:1 to 2:1; and the positive electrode active material comprises secondary particles formed by primary particles; at least 50% of the primary particles in the secondary particle are arranged radially from the center of the secondary particle to a periphery thereof; in an outer layer of the secondary particle, 70% or more of the primary particles each have at least two parallel sides; and in a cross section along the center of the secondary particle, 60% or more of the primary particles each have at least two parallel sides, and an average length-width ratio of the primary particles ranges from 2:1 to 15:1, a concentration of element B ranges from 100 ppm to 4500 ppm, a concentration of element M1 ranges from 100 ppm to 6000 ppm, and concentration of element M2 ranges from 1000 ppm to 6000 ppm.

20. The preparation method according to claim 19, wherein a sintering temperature in step (1) ranges from 700° C. to 1000° C., and optionally from 750° C. to 950° C.; and/or a sintering temperature in step (2) ranges from 180° C. to 700° C., and optionally from 200° C. to 650° C.

21. The preparation method according to claim 19, further comprising wherein the method further comprises:

between step (1) and step (2), washing the positive electrode active material matrix in a solution, and performing drying.

22. The preparation method according to claim 19, wherein the active material precursor is a ternary active material precursor $[Ni_xCo_yMn_z](OH)_2$, wherein $0.65<x<1$, $0<y<0.3$, and $0<z<0.3$.

23. A positive electrode active material, prepared by using the method according to claim 19.

* * * * *